(12) United States Patent
Takayanagi et al.

(10) Patent No.: US 10,197,003 B2
(45) Date of Patent: *Feb. 5, 2019

(54) CONTROL DEVICE FOR SUPERCHARGING SYSTEM

(71) Applicant: MITSUBISHI HEAVY INDUSTRIES, LTD., Tokyo (JP)

(72) Inventors: Ko Takayanagi, Tokyo (JP); Byeongil An, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 15/030,656

(22) PCT Filed: Nov. 27, 2014

(86) PCT No.: PCT/JP2014/081381
§ 371 (c)(1),
(2) Date: Apr. 20, 2016

(87) PCT Pub. No.: WO2015/083611
PCT Pub. Date: Jun. 11, 2015

(65) Prior Publication Data
US 2016/0265468 A1 Sep. 15, 2016

(30) Foreign Application Priority Data
Dec. 4, 2013 (JP) .................................. 2013-251248

(51) Int. Cl.
*F02B 33/44* (2006.01)
*F02B 33/00* (2006.01)
(Continued)

(52) U.S. Cl.
CPC ............ *F02D 41/26* (2013.01); *F02B 37/013* (2013.01); *F02B 37/04* (2013.01); *F02B 37/18* (2013.01);
(Continued)

(58) Field of Classification Search
CPC ........ F02B 37/013; F02B 37/04; F02B 37/18; F02B 37/186; F02B 37/24;
(Continued)

(56) References Cited

U.S. PATENT DOCUMENTS

| 4,756,377 A | 7/1988 | Kawamura et al. |
| 4,774,811 A | 10/1988 | Kawamura |

(Continued)

FOREIGN PATENT DOCUMENTS

| CN | 1360714 A | 7/2002 |
| CN | 101105429 A | 1/2008 |

(Continued)

OTHER PUBLICATIONS

International Search Report and Written Opinion of the International Searching Authority (Forms PCT/ISA/210, PCT/ISA/220 and PCT/ISA/237), dated Feb. 3, 2015, for International Application No. PCT/JP2014/079634.

(Continued)

*Primary Examiner* — Thai Ba Trieu
(74) *Attorney, Agent, or Firm* — Birch, Stewart, Kolasch & Birch, LLP

(57) ABSTRACT

A control device (10) for a supercharging system for supplying compressed intake air to an engine (2) includes: an engine controller (10A) including an engine-signal input part (10A1) and an engine control part (10B1) configured to control an operational state of the engine; and a turbo controller (10B) including a turbo-signal input part (10B1) and a turbo-control part (10B2) including a turbo-control-
(Continued)

command-value computing part (10B2a) configured to compute a turbo control command value corresponding to a target boost pressure of the supercharger (3). The boost-pressure control unit is controlled so that a boost pressure of the supercharger reaches the target boost pressure through output of the turbo control command value computed by the turbo-control-command-value computing part to the boost-pressure control unit.

11 Claims, 22 Drawing Sheets

(51) Int. Cl.
| | |
|---|---|
| F02D 41/26 | (2006.01) |
| F02B 37/013 | (2006.01) |
| F02B 37/04 | (2006.01) |
| F02B 37/18 | (2006.01) |
| F02B 37/24 | (2006.01) |
| F02D 41/00 | (2006.01) |
| F02D 41/14 | (2006.01) |
| F02B 37/12 | (2006.01) |

(52) U.S. Cl.
CPC ............ *F02B 37/186* (2013.01); *F02B 37/24* (2013.01); *F02D 41/0007* (2013.01); *F02D 41/1401* (2013.01); *F02D 41/266* (2013.01); *F02B 2037/125* (2013.01); *F02D 41/1446* (2013.01); *F02D 2041/001* (2013.01); *F02D 2041/141* (2013.01); *F02D 2041/1419* (2013.01); *F02D 2041/1422* (2013.01); *F02D 2200/0406* (2013.01); *F02D 2200/0614* (2013.01); *F02D 2200/602* (2013.01); *Y02T 10/144* (2013.01)

(58) Field of Classification Search
CPC .. F02B 2037/125; F02M 26/04; F02M 26/05; F02M 26/06; F02M 26/08; F02D 41/26; F02D 41/0007; F02D 41/1401; F02D 41/266; F02D 41/1446; F02D 2041/001; F02D 2041/141; F02D 2014/1419; F02D 41/1422; F02D 2200/0406; F02D 2200/0614; F02D 2200/602; Y02T 10/144
USPC ............ 60/605.1, 600–603, 605.2, 611–612; 123/562; 701/102–104, 108
See application file for complete search history.

(56) References Cited

U.S. PATENT DOCUMENTS

| | | | |
|---|---|---|---|
| 4,884,407 A | 12/1989 | Hatanaka | |
| 5,063,744 A | 11/1991 | Ishiyama et al. | |
| 5,645,033 A | 7/1997 | Person et al. | |
| 5,873,248 A | 2/1999 | Houtz | |
| 6,089,018 A | 7/2000 | Bischoff et al. | |
| 6,209,390 B1 | 4/2001 | LaRue et al. | |
| 6,327,856 B1 * | 12/2001 | Iwabuchi ............ F02D 41/0007 60/602 |
| 7,089,738 B1 * | 8/2006 | Boewe .................... F02B 37/24 60/602 |
| 7,805,939 B2 * | 10/2010 | Kimoto ............... F02D 41/0007 60/612 |
| 8,051,661 B2 | 11/2011 | Igarashi et al. | |
| 8,584,460 B2 | 11/2013 | Mårdberg Jozsa et al. | |
| 8,813,494 B2 | 8/2014 | Hofer et al. | |
| 2003/0145591 A1 | 8/2003 | Arnold | |
| 2004/0139809 A1 | 7/2004 | Soechting et al. | |
| 2004/0187495 A1 | 9/2004 | Ando et al. | |
| 2005/0193810 A1 | 9/2005 | Gladden | |
| 2006/0021344 A1 | 2/2006 | Barba et al. | |
| 2006/0026960 A1 | 2/2006 | Butscher et al. | |
| 2006/0113799 A1 | 6/2006 | Obayashi et al. | |
| 2006/0287795 A1 | 12/2006 | Samad et al. | |
| 2007/0033938 A1 | 2/2007 | Ueno | |
| 2008/0047268 A1 | 2/2008 | Isogai et al. | |
| 2009/0107140 A1 | 4/2009 | Pursifull | |
| 2009/0132153 A1 | 5/2009 | Shutty et al. | |
| 2009/0222190 A1 | 9/2009 | Andreae et al. | |
| 2009/0287448 A1 | 11/2009 | Brown et al. | |
| 2009/0299609 A1 | 12/2009 | Gokhale | |
| 2011/0192161 A1 | 8/2011 | Takahaski et al. | |
| 2011/0288744 A1 | 11/2011 | Gokhale et al. | |
| 2013/0167810 A1 | 7/2013 | Roplekar et al. | |
| 2013/0227944 A1 | 9/2013 | Denholm et al. | |
| 2015/0037178 A1 | 2/2015 | Wang | |
| 2015/0122234 A1 | 5/2015 | Tanaka | |
| 2015/0285122 A1 | 10/2015 | Yamashita et al. | |
| 2015/0285191 A1 * | 10/2015 | Kitada .................. F02B 37/013 60/605.2 |
| 2016/0265468 A1 | 9/2016 | Takayanagi et al. | |
| 2016/0305353 A1 * | 10/2016 | Sase ....................... F02B 37/013 |
| 2017/0002726 A1 | 1/2017 | Iwamoto | |

FOREIGN PATENT DOCUMENTS

| | | |
|---|---|---|
| CN | 101424211 A | 5/2009 |
| CN | 101273385 B | 5/2010 |
| CN | 102177323 A | 9/2011 |
| CN | 102418610 A | 4/2012 |
| EP | 2 317 082 A2 | 5/2011 |
| EP | 2434123 A1 | 3/2012 |
| JP | 58-53643 A | 3/1983 |
| JP | 59-52139 U | 4/1984 |
| JP | 61-38127 U | 3/1986 |
| JP | 62-210222 A | 9/1987 |
| JP | 64-32019 A | 2/1989 |
| JP | 5-33668 A | 2/1993 |
| JP | 5-280365 A | 10/1993 |
| JP | 6-323158 A | 11/1994 |
| JP | 6-341325 A | 12/1994 |
| JP | 7-150990 A | 6/1995 |
| JP | 8-326555 A | 12/1996 |
| JP | 9-329032 A | 12/1997 |
| JP | 10-159576 A | 6/1998 |
| JP | 2000-179348 A | 6/2000 |
| JP | 2000-356158 A | 12/2000 |
| JP | 2001-342840 A | 12/2001 |
| JP | 2002-188474 A | 7/2002 |
| JP | 2002-544443 A | 12/2002 |
| JP | 2003-227362 A | 8/2003 |
| JP | 2003-269183 A | 9/2003 |
| JP | 2004-27897 A | 1/2004 |
| JP | 2004-251203 A | 9/2004 |
| JP | 2005-83317 A | 3/2005 |
| JP | 2005-155384 A | 6/2005 |
| JP | 2005-248952 A | 9/2005 |
| JP | 2005-351129 A | 12/2005 |
| JP | 2006-63873 A | 3/2006 |
| JP | 2006-188989 A | 7/2006 |
| JP | 2006-207506 A | 8/2006 |
| JP | 2006-242462 A | 9/2006 |
| JP | 2006-242487 A | 9/2006 |
| JP | 2007-32860 A | 2/2007 |
| JP | 2007-206007 A | 8/2007 |
| JP | 2008-45410 A | 2/2008 |
| JP | 2008-175126 A | 7/2008 |
| JP | 2008-544144 A | 12/2008 |
| JP | 4209350 B2 | 1/2009 |
| JP | 2010-14122 A | 1/2010 |
| JP | 4415912 B2 | 2/2010 |
| JP | 2010-180710 A | 8/2010 |
| JP | 2010-190145 A | 9/2010 |
| JP | 2011-247181 A | 12/2011 |
| JP | 2011-256743 A | 12/2011 |
| JP | 2012-7544 A | 1/2012 |
| JP | 2012-52508 A | 3/2012 |
| JP | 2013-19319 A | 1/2013 |
| JP | 2013-127221 A | 6/2013 |
| JP | 2013-133776 A | 7/2013 |

(56) References Cited

FOREIGN PATENT DOCUMENTS

| JP | 2013-185441 A | 9/2013 |
|---|---|---|
| JP | 2013-217382 A | 10/2013 |
| JP | 2014-84772 A | 5/2014 |
| WO | WO 00/70562 A1 | 11/2000 |
| WO | WO 03/071111 A1 | 8/2003 |
| WO | WO 2006/138545 A1 | 12/2006 |
| WO | WO 2007/055094 A1 | 5/2007 |
| WO | WO 2007/141613 A1 | 12/2007 |
| WO | WO 2013/004595 A1 | 1/2013 |
| WO | WO 2013/066529 A1 | 5/2013 |
| WO | WO 2013/157126 A1 | 10/2013 |

OTHER PUBLICATIONS

International Search Report and Written Opinion of the International Searching Authority (Forms PCT/ISA/210, PCT/ISA/220 and PCT/ISA/237), dated Jan. 27, 2015, for International Application No. PCT/JP2014/081384.
International Search Report and Written Opinion of the International Searching Authority (Forms PCT/ISA/210, PCT/ISA/220 and PCT/ISA/237), dated Mar. 3, 2015, for International Application No. PCT/JP2014/081381.
International Search Report and Written Opinion of the International Searching Authority (Forms PCT/ISA/210, PCT/ISA/220 and PCT/ISA/237), dated Mar. 3, 2015, for International Application No. PCT/JP2014/081387.
International Search Report and Written Opinion of the International Searching Authority (Forms PCT/ISA/210, PCT/ISA/220 and PCT/ISA/237), dated Mar. 3, 2015, for International Application No. PCT/JP2014/081723.
Extended European Search Report, dated Jul. 1, 2016, for European Application No. 14868701.5.
Extended European Search Report dated Nov. 4, 2016 in corresponding EP Application No. 14868295.8.
Extended European Search Report dated Jan. 10, 2017 issued in corresponding EP Application No. 14867944.2.
Partial Supplementary European Search Report, dated Feb. 28, 2017, for European Application No. 14868535.7.
Partial Supplementary European Search Report, dated Mar. 2, 2017, for European Application No. 14867002.9.
Office Action dated May 31, 2017, issued to the corresponding Chinese Application No. 201480051228.1 with an English Translation.
Extended European Search Report dated Jun. 8, 2017 issued to the corresponding EP Application No. 14867002.9.
Extended European Search Report dated Jun. 8, 2017 issued to the corresponding EP Application No. 14868535.7.
Chinese Office Action and Search Report, dated Aug. 3, 2017, for Chinese Application No. 201480051852.1, with an English translation of the Office Action.
Chinese Office Action and Search Report, dated Aug. 7, 2017, for Chinese Application No. 201480050503.8, with an English translation of the Office Action.
Chinese Office Action and Search Report for Chinese Application No. 201480060612.8, dated Sep. 5, 2017, with an English translation of the Office Action.
Japanese Notification of Reasons for Refusal for Japanese Application No. 2013-251248, dated Sep. 1, 2017, with an English translation.
U.S. Office Action for U.S. Appl. No. 15/024,642, dated Sep. 15, 2017.
Chinese Office Action and Search Report for Chinese Application No. 201480065709.8, dated Nov. 3, 2017, with English translation of the Office Action.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/079634, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081381, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081384, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081387, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081723, together with an English translation thereof.
Chinese Office Action, dated Jun. 26, 2018, for Chinese Application No. 201480060612.8 with an English translation.
Japanese Office Action, dated Jun. 29, 2018, for Japanese Application No. 2014-236571, with an English translation.
U.S. Office Action for U.S. Appl. No. 15/100,846, dated Aug. 2, 2018.

* cited by examiner

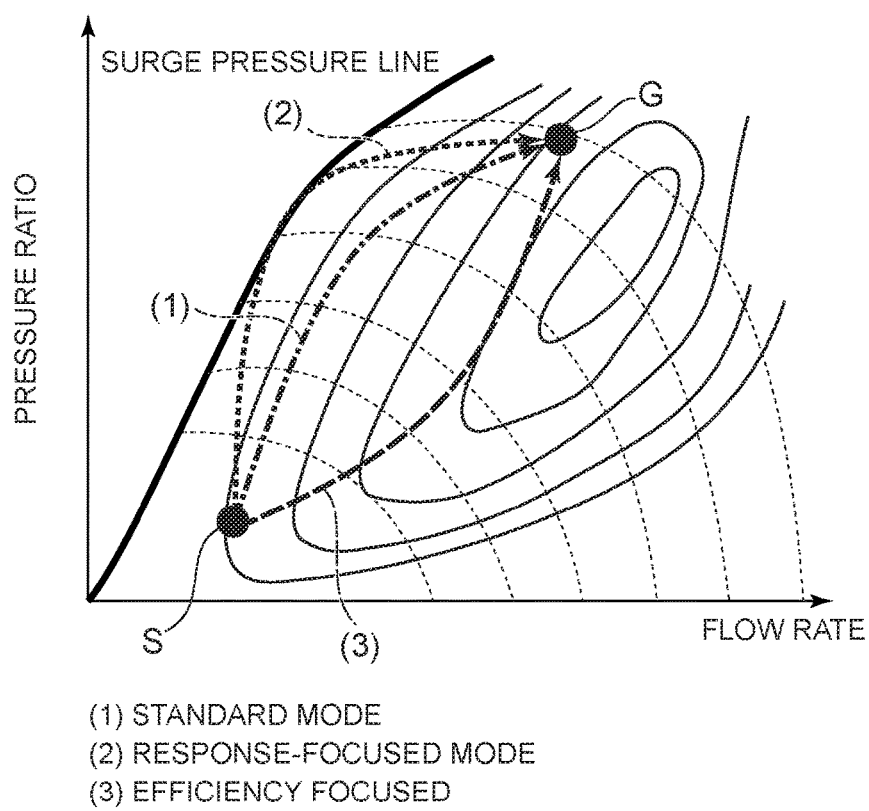

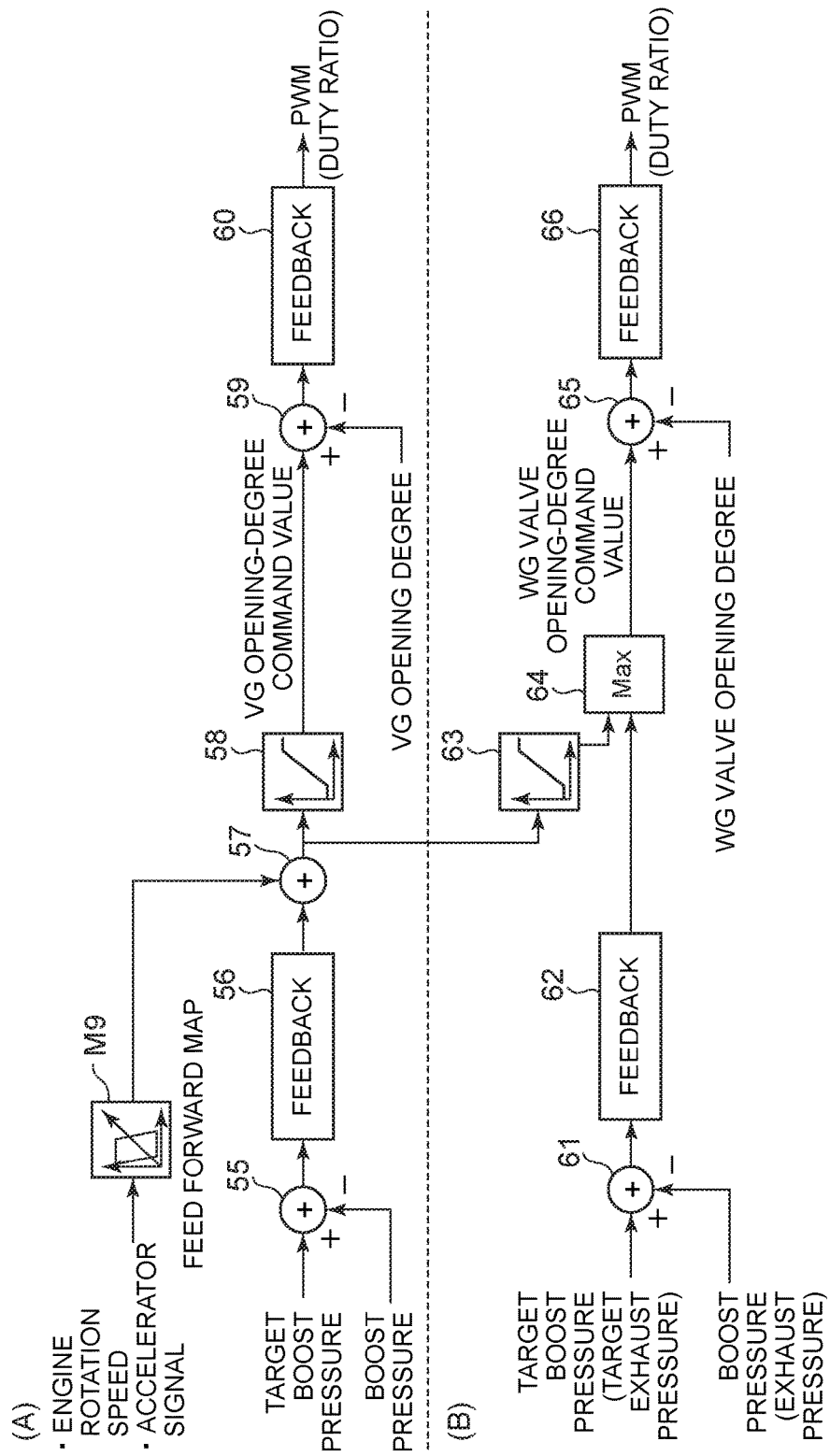

CONTROL DEVICE FOR SUPERCHARGING SYSTEM

TECHNICAL FIELD

The present disclosure relates to a control device for a supercharging system for supplying compressed intake air to an engine.

BACKGROUND ART

As a technique to improve an output of an engine, a method (supercharging) of compressing intake air with a supercharger and supplying an engine with the compressed intake air is known, and widely used in an engine for an automobile and the like. A supercharger may be transitionally in an abnormal operational state with surging, over-speed, or the like, depending on the operational state of the supercharger. Such abnormal operation may lead to breakage of various devices, and should be prevented as much as possible.

Patent Document 1 discloses an invention, which is a control device for a turbocharger, for suppressing surging by predicting occurrence of surging from an operational state of a turbocharger and opening a waste-gate valve immediately before occurrence of surging to reduce a flow rate of exhaust gas flowing to a turbine.

Patent Document 2 discloses an invention, which is a supercharging control device, for suppressing surging by providing a compressor-bypass valve for returning intake air from a downstream side toward an upstream side of a compressor and closing the bypass valve to return intake air if occurrence of surging is predicted.

Patent Document 3 discloses an invention, as a control device for a variable geometry turbocharger, for suppressing over-speed of a turbocharger by changing a vane angle of nozzle vanes to achieve the maximum nozzle area in case of over-speed.

CITATION LIST

Patent Literature

Patent Document 1: JP2004-27897A
Patent Document 2: JP2006-207506A
Patent Document 3: JPH5-280365A

SUMMARY

Problems to be Solved

Meanwhile, in accordance with improvement of engines in recent years, control logics and hardware of an engine controller are becoming increasingly complicated. In this context, techniques disclosed in the above Patent Documents 1 to 3 have a problem of increasingly complicated control logics and hardware of an engine controller, because functions for preventing surging are installed in the engine controller. Further, if a quickly-changing transitional phenomenon like surging is to be controlled by an engine controller with complicated control logics and hardware configuration, communication delay of the engine controller may be a problem.

At least one embodiment of the present invention was made in view of the above conventional problems, and an object of at least one embodiment is to provide a control device for a supercharging system capable of preventing surging in advance while suppressing rapid fluctuation of a boost pressure, and of controlling the boost pressure quickly by avoiding an influence from communication delay.

Solution to the Problems

According to at least one embodiment of the present invention, a control device for a supercharging system for supplying compressed intake air to an engine, the supercharging system comprising a supercharger configured to compress intake air to be supplied to the engine, a boost-pressure control unit configured to control a boost pressure of the supercharger, and a control device configured to control the boost-pressure control unit, comprises: an engine controller comprising an engine-signal input part to which various sensor signals related to an operational state of the engine are to be inputted, and an engine control part configured to control an operational state of the engine on the basis of the sensor signals inputted into the engine-signal input part; and a turbo controller comprising a turbo-signal input part to which at least sensor signals related to an operational state of the supercharger are to be inputted from among the various sensor signals related to an operational state of the engine, and a turbo-control part including a turbo-control-command-value computing part configured to compute a turbo control command value corresponding to a target boost pressure of the supercharger, the turbo controller comprising a control part and a signal input part provided separately and independently from the engine controller. The boost-pressure control unit is configured to be controlled so that a boost pressure of the supercharger reaches the target boost pressure through output of the turbo control command value computed by the turbo-control-command-value computing part to the boost-pressure control unit.

The above described control device for a supercharging system includes the turbo controller equipped with the control part and the signal input part provided separately and independently from the engine controller. The turbo controller basically controls the supercharger alone, unlike the engine controller which controls a plurality of devices at the same time. Thus, with the turbo control part of the turbo controller computing a turbo control command value, which is outputted to the boost-pressure control unit, it is unnecessary to communicate with the engine controller with regard to control of the boost-pressure control unit, which makes it possible to control a boost pressure quickly while avoiding an influence from delay in communication with the engine controller.

In some embodiments, the turbo control part includes a margin computing part configured to compute a margin of the supercharger on the basis of the sensor signals inputted to the turbo-signal input part. The engine control part includes a surge/over-speed permission determination part configured to compare the margin computed by the margin computing part with a margin threshold predetermined in advance. A response time before the boost pressure of the supercharger reaches the target boost pressure is longer if the margin is below the margin threshold than if the margin is over the margin threshold.

According to the above embodiment, if a margin being an index representing allowance with respect to surging, which is a surge margin, is smaller than a margin threshold, a response time before the boost pressure of the supercharger reaches a target boost pressure is longer than that in a case in which the margin is greater than the margin threshold. Thus, surging is prevented in a state in which there is no allowance with respect to surging, such as when a margin is smaller than a margin threshold, which makes it possible to reduce abnormal operation of the turbocharger.

In the above embodiment, the margin threshold is determined on the basis of a difference between the target boost pressure of the supercharger and an actual boost pressure, or a difference between a target fuel-injection amount and an actual fuel-injection amount.

According to the above embodiment, it is possible to set a suitable margin threshold in accordance with an actual operational state of the engine, by setting a larger margin threshold if a difference between a target boost pressure and an actual boost pressure is large or if a difference between a target fuel-injection amount and an actual fuel-injection amount is large, and by setting a smaller margin threshold if the difference is small.

In some embodiments, the engine control part of the engine controller includes a boost-pressure control mode command determination part configured to recognize one boost-pressure control mode selected from among two or more boost-pressure control modes. Further, the turbo-control-command-value computing part is configured to perform a feedback control on the turbo control command value on the basis of a control gain determined in advance and a difference between a target boost pressure of the supercharger and an actual boost pressure, and to vary the control gain in accordance with the one boost-pressure control mode recognized by the boost-pressure control mode command determination part.

According to the above embodiment, it is possible to perform a boost-pressure control corresponding to a selected boost-pressure control mode by using a different control gain in accordance with the boost-pressure control mode.

For instance, if there are three boost-pressure control modes including a response-focused mode for performing a boost-pressure control focused on responsiveness so as to achieve a target boost pressure instantly, an efficiency-focused mode for performing a boost-pressure control focused on fuel efficiency, and a standard mode intermediate of the former two modes, the control gain may be set so as to be greater in an order of the response-focused mode>the standard mode>the efficiency-focused mode, which makes it possible to perform a boost-pressure control corresponding to the selected boost-pressure control mode.

In some embodiments, the supercharger comprises a variable geometry turbocharger including a turbine disposed in an exhaust duct of the engine and driven to rotate by exhaust energy from the engine, a compressor disposed in an intake duct of the engine and coaxially driven with the turbine, and a variable control mechanism configured to control a flow of the exhaust gas flowing into the turbine, and the control device is configured to adjust the variable control mechanism to control a flow of the exhaust gas flowing into the turbine to control a boost pressure of the supercharger.

According to the above embodiment, the variable control mechanism being a boost-pressure control unit is adjusted to control a flow of exhaust gas flowing into the turbine to control a boost pressure of the supercharger, which makes it possible to prevent surging in advance while suppressing rapid fluctuation of the boost pressure.

In some embodiments, the supercharger comprises a turbocharger including a turbine disposed in an exhaust duct of the engine and driven to rotate by exhaust energy from the engine, and a compressor disposed in an intake duct of the engine and driven coaxially with the turbine. A bypass channel bypassing the turbine is connected to the exhaust duct of the engine and a waste-gate valve is disposed in the bypass channel, and the control device is configured to adjust a valve opening degree of the waste-gate valve to control a boost pressure of the supercharger.

According to the above embodiment, the valve opening degree of the waste-gate valve being a boost-pressure control unit is adjusted to control a boost pressure of the supercharger, which makes it possible to prevent surging in advance while suppressing rapid fluctuation of the boost pressure.

In some embodiments, the supercharger comprises a variable geometry turbocharger including a turbine disposed in an exhaust duct of the engine and driven to rotate by exhaust energy from the engine, a compressor disposed in an intake duct of the engine and coaxially driven with the turbine, and a variable control mechanism configured to control a flow of the exhaust gas flowing into the turbine. A bypass channel bypassing the turbine is connected to the exhaust duct of the engine and a waste-gate valve is disposed in the bypass channel, and the control device is configured to adjust the variable control mechanism to control a flow of the exhaust gas flowing into the turbine to control a boost pressure of the supercharger, and to adjust a valve opening degree of the waste-gate valve to control a boost pressure of the supercharger.

According to the above embodiment, a VG opening degree of the variable control mechanism being a boost-pressure control unit and a WG valve opening degree of the waste-gate valve being a boost-pressure control unit are adjusted to control a boost pressure of the supercharger, which makes it possible to prevent surging in advance while suppressing rapid fluctuation of the boost pressure.

Further, in the above embodiment, the control device may be configured such that control of the boost-pressure control by the variable control mechanism is higher than that of the boost-pressure control by the waste-gate valve, which makes it possible to control the supercharger efficiently and in a broader range.

In some embodiments, the supercharger comprises: a turbocharger including a turbine disposed in an exhaust duct of the engine and driven to rotate by exhaust energy of exhaust gas discharged from the engine, and a compressor disposed in an intake duct of the engine and coaxially driven with the turbine; and an electric turbocharger including an electric compressor disposed on an upstream side or a downstream side of the compressor of the turbocharger, a motor configured to drive the electric compressor to rotate, and a rotation-speed control unit configured to control a rotation speed of the motor. A bypass channel bypassing the turbine is connected to the exhaust duct of the engine and a waste-gate valve is disposed in the bypass channel, and the control device is configured to adjust a valve opening degree of the waste-gate valve to control a boost pressure of the turbocharger, and to control a rotation speed of the motor with the rotation-speed control unit to control a boost pressure of the electric turbocharger.

According to the above embodiment, in a so-called two-stage supercharging system including a turbocharger and an electric turbocharger, the valve opening degree of the waste-gate valve being a boost-pressure control unit for the turbocharger is adjusted and the rotation speed of a motor is controlled by the rotation-speed control unit being a boost-pressure control unit for the electric turbocharger, which makes it possible control boost pressures of the turbocharger and the electric turbocharger individually, and to prevent surging in advance while suppressing rapid fluctuation of the boost pressure.

In some embodiments, the supercharger comprises: a high-pressure stage turbocharger including a high-pressure stage turbine disposed in an exhaust duct of the engine and driven to rotate by exhaust energy of exhaust gas discharged from the engine, and a high-pressure stage compressor disposed in an intake duct of the engine and coaxially driven with the high-pressure stage turbine; and a low-pressure stage turbocharger including a low-pressure stage turbine disposed in the exhaust duct at a downstream side of the high-pressure stage turbine, and a low-pressure stage compressor disposed in the intake duct at an upstream side of the high-pressure stage compressor and coaxially driven with the low-pressure stage turbine. A high-pressure stage bypass channel bypassing the high-pressure stage turbine and a low-pressure stage bypass channel bypassing the low-pressure stage turbine are connected to the exhaust duct of the engine, a high-pressure stage waste-gate valve is disposed in the high-pressure stage bypass channel, and a low-pressure stage waste-gate valve is disposed in the low-pressure stage bypass channel. Further, the control device is configured to adjust valve opening degrees of the high-pressure stage waste-gate valve and the low-pressure stage waste-gate valve individually to control boost pressures of the high-pressure stage turbocharger and the low-pressure stage turbocharger individually.

According to the above embodiment, in a so-called two-stage supercharging system including a high-pressure stage turbocharger and a low-pressure stage turbocharger, the valve opening degree of the high-pressure stage waste-gate valve being a boost-pressure control unit for the high-pressure stage turbocharger and the valve opening degree of the low-pressure stage waste-gate valve being a boost-pressure control unit for the low-pressure stage turbocharger are adjusted individually to control boost pressures of the high-pressure stage turbocharger and the low-pressure stage turbocharger individually, which makes it possible to prevent surging in advance while suppressing rapid fluctuation of a boost pressure.

In some embodiments, the supercharger comprises: a high-pressure stage turbocharger including a high-pressure stage turbine disposed in an exhaust duct of the engine and driven to rotate by exhaust energy of exhaust gas discharged from the engine, and a high-pressure stage compressor disposed in an intake duct of the engine and coaxially driven with the high-pressure stage turbine; and a low-pressure stage turbocharger including a low-pressure stage turbine disposed in the exhaust duct at a downstream side of the high-pressure stage turbine, and a low-pressure stage compressor disposed in the intake duct at an upstream side of the high-pressure stage compressor and coaxially driven with the low-pressure stage turbine. At least one of the high-pressure stage turbocharger or the low-pressure stage turbocharger comprises a variable geometry turbocharger including a variable control mechanism configured to control a flow of the exhaust gas flowing into the high-pressure stage turbine or the low-pressure stage turbine. Further, the control device is configured to adjust the variable control mechanism of the at least one of the high-pressure stage turbocharger or the low-pressure stage turbocharger to control a flow of the exhaust gas to control a boost pressure of the at least one of the high-pressure stage turbocharger or the low-pressure stage turbocharger.

According to the above embodiment, in a so-called two-stage supercharging system including a high-pressure stage turbocharger and a low-pressure stage turbocharger, at least one of the variable control mechanism of the high-pressure stage turbocharger being a boost-pressure control unit for the high-pressure stage turbocharger or the variable control mechanism of the low-pressure stage turbocharger being a boost-pressure control unit for the low-pressure stage turbocharger is adjusted to control the boost pressure of the at least one of the high-pressure stage turbocharger or the low-pressure stage turbocharger, which makes it possible to prevent surging in advance while suppressing rapid fluctuation of the boost pressure.

Advantageous Effects

According to at least one embodiment of the present invention, it is possible to provide a control device for a supercharging system capable of preventing surging in advance while suppressing rapid fluctuation of a boost pressure, and to avoid an influence from communication delay to control the boost pressure quickly.

BRIEF DESCRIPTION OF DRAWINGS

FIG. 8 is a compressor characteristic chart for describing boost-pressure control modes.

FIG. 14A is a block diagram for describing a working example of another one of control logics of a turbo ECU according to the second embodiment.

DETAILED DESCRIPTION

Embodiments of the present invention will now be described in detail with reference to the accompanying drawings.

However, the scope of the present invention is not limited to the following embodiments.

It is intended that dimensions, materials, shapes, relative positions and the like of components described in the embodiments shall be interpreted as illustrative only and not limitative of the scope of the present invention.

First Embodiment

Figure 1:
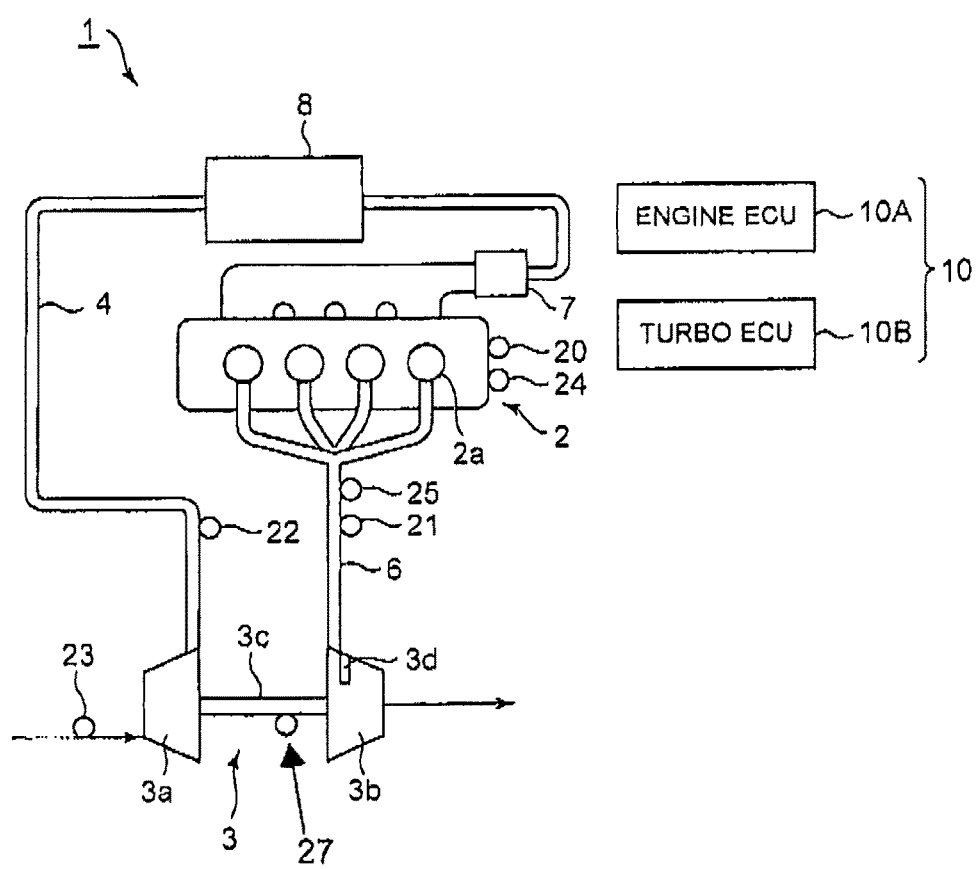
FIG. 1 is an overall configuration diagram of an engine system to which a control device of a supercharging system according to the first embodiment of the present invention is to be applied.

FIG. 1 is an overall configuration diagram of an engine system to which a control device for a supercharging system according to the first embodiment of the present invention is to be applied.

In the engine system 1 according to the present embodiment illustrated in FIG. 1, air (intake air) introduced into an intake duct 4 via an air cleaner (not illustrated) flows into a compressor 3a of a turbocharger 3 (supercharger). The turbocharger 3 includes a compressor 3a disposed in the intake duct 4, a turbine 3b disposed in an exhaust duct 6, and a shaft 3c coupling the compressor 3a and the turbine 3b. The turbine 3b is driven to rotate by exhaust energy of exhaust gas discharged from the engine 2, and the compressor 3a is coaxially driven in accordance with the turbine 3b, thereby compressing the intake air having flowed into the compressor 3a.

The intake air compressed by the compressor 3a is cooled by an inter cooler 8, and an amount of the intake air is adjusted by a throttle valve 7. The intake air is premixed with fuel injected by an injector (not illustrated), and then supplied to each combustion chamber 2a of the engine 2. Premixed gas supplied to each combustion chamber 2a is ignited by a spark plug (not illustrated) to combust and expand in the combustion chamber 2a. Exhaust gas generated in the combustion chamber 2a is discharged to the exhaust duct 6. The exhaust gas discharged to the exhaust duct 6 flows into the turbine 3b of the above described turbocharger 3 to drive the turbine 3b to rotate.

The turbocharger 3 of the present embodiment is configured as a variable geometry turbocharger including a variable control mechanism 3d which controls a flow of exhaust gas flowing into the turbine 3b.

The variable control mechanism 3d is adjusted to control a flow of exhaust gas flowing into the turbine 3 to control the rotation speed of the turbine 3b and the rotation speed of the compressor 3a driven coaxially with the turbine 3b, thereby controlling the boost pressure of the turbocharger 3. The rotation speed of the turbocharger 3 is detected by a turbo rotation speed sensor 27.

In other words, in the present embodiment, the variable control mechanism 3d corresponds to a boost-pressure control unit to control a boost pressure of intake air compressed by the compressor 3a. The above turbocharger 3, for instance, includes a variable geometry (VG) turbocharger equipped with a variable nozzle mechanism 3d including a plurality of nozzle vanes disposed rotatably on a radially outer side of the turbine 3b, and a variable flow (VF) turbocharger including a mechanism 3d to change a flow direction of exhaust gas flowing into a turbine, the mechanism 3d being disposed on an inlet of the turbine 3b.

The variable control mechanism 3d is controlled by a control device 10. The supercharging system of the present embodiment includes the above described turbocharger 3, the variable control mechanism 3d of the turbocharger 3, and the control device 10.

The control device 10 includes an engine ECU 10A (engine controller) and a turbo ECU 10B (turbo controller). The engine ECU 10A and the turbo ECU 10B each include a microcomputer separate from one another, the microcomputer including a central processing unit (CPU), a random access memory (RAM), a read only memory (ROM), and an I/O interface.

Figure 2:
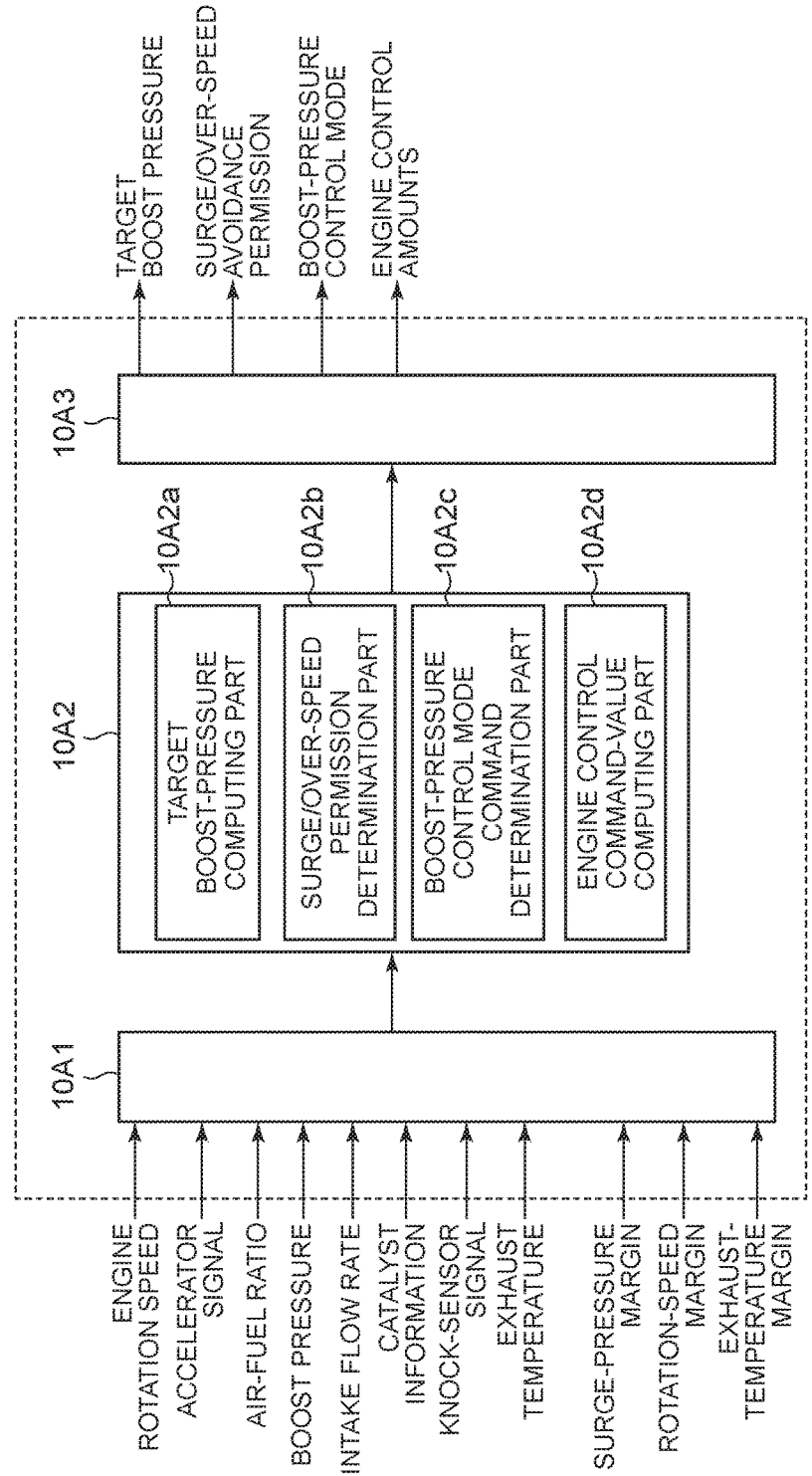
FIG. 2 is a block diagram for describing functions of an engine ECU.

FIG. 2 is a block diagram for describing functions of an engine ECU. As illustrated in FIG. 2, the engine ECU 10A includes an engine-signal input part 10A1 to which various sensor signals related to an operational state of the engine are inputted, an engine control part 10A2 for controlling an operational state or the like of the engine, and an engine-signal output part 10A3 for outputting control command values or the like for various devices computed by the engine control part 10A2.

Figure 3:
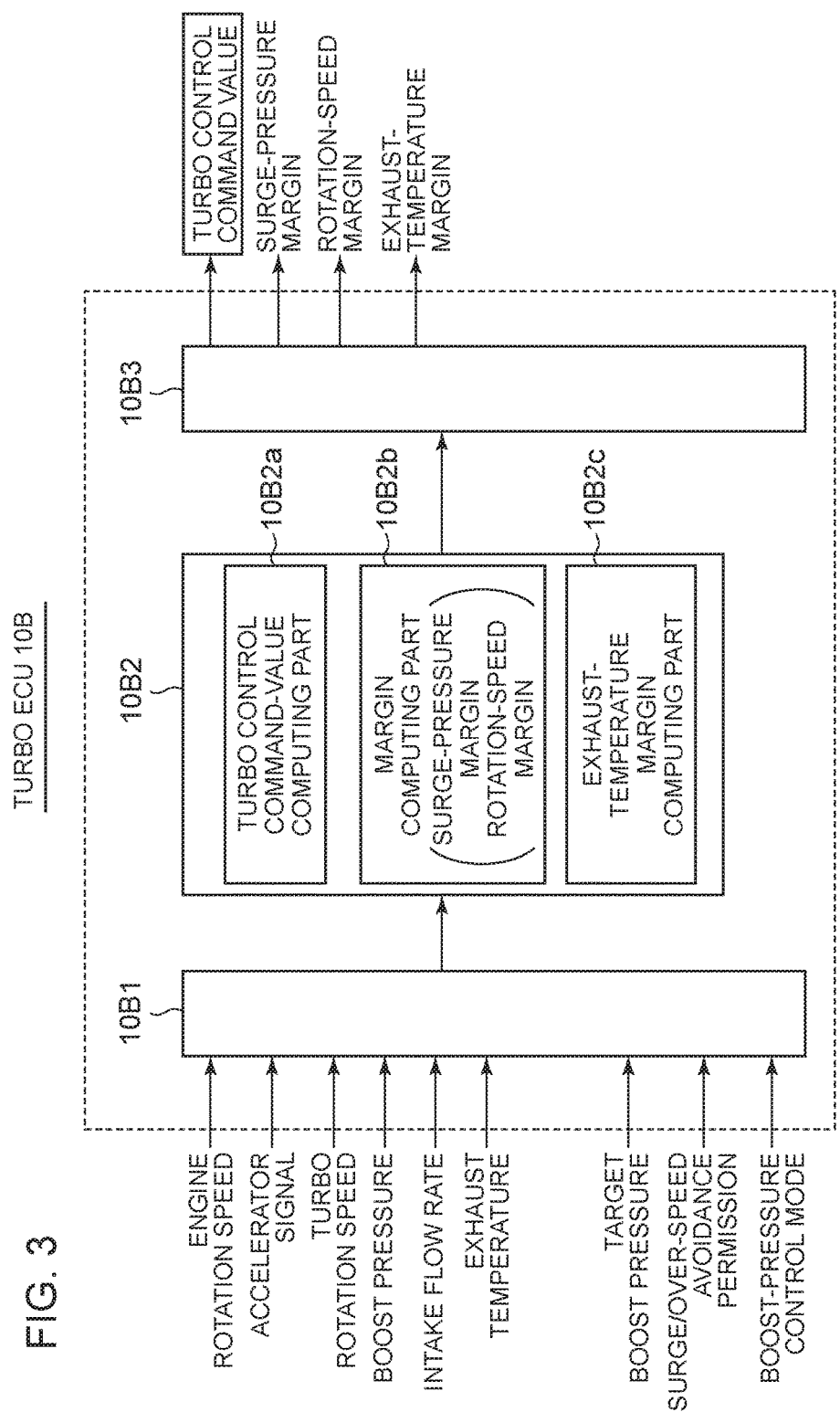
FIG. 3 is a block diagram for describing functions of a turbo ECU.

FIG. 3 is a block diagram for describing functions of a turbo ECU. As illustrated in FIG. 3, the turbo ECU 10B includes a turbo-signal input part 10B1 to which at least sensor signals related to an operational state of the turbocharger 3 are inputted, from among various signals related to the operational state of the engine, a turbo control part 10B2 for computing a margin or the like described below of the turbocharger 3, and a turbo-signal output part 10B3 for outputting the margin or the like computed by the turbo control part 10B2.

As illustrated in FIG. 2, various sensor signals related to an operational state of the engine are inputted to the engine-signal input part 10A1 of the engine ECU 10A, the sensor signals including: an engine rotation speed detected by a rotation-speed sensor 20; an accelerator signal detected by an accelerator-position sensor (not illustrated); an air-fuel ratio detected by an air-fuel ratio sensor 21; a boost pressure detected by a pressure sensor 22; an intake flow rate detected by an air-flow meter 23; catalyst information including a catalyst temperature transmitted from a catalyst device (not illustrated) for purifying exhaust gas; a knock-sensor signal detected by a knock sensor 24; and an exhaust temperature detected by an exhaust-temperature sensor 25. Further, a surge-pressure margin, a rotation-speed margin, and an exhaust-temperature margin computed by the turbo ECU 10B are inputted.

A surge-pressure margin here is an index representing an allowance with respect to surging. A rotation-speed margin here is an index representing an allowance with respect to over-speed of the turbocharger 3. Since the above two indexes both relate to surging, the two indexes are collectively referred to as a margin (surge margin) hereinafter. Further, an exhaust-temperature margin here is an index representing an allowance with respect to an allowable temperature of the turbocharger 3.

The engine control part 10A2 of the engine ECU 10A includes a target boost-pressure computing part 10A2a which computes a target boost pressure of the turbocharger 3, a surge/over-speed permission determination part 10A2b which permits control on the variable control mechanism 3d by the turbocharger 3, a boost-pressure control mode command determination part 10A2c which recognizes one boost-pressure control mode selected from two or more boost-pressure control modes, and an engine-control-command-value computing part 10A2d which computes engine control command values for various devices, the values including a variable-valve timing, a throttle opening degree, and a fuel-injection amount.

Figure 4:
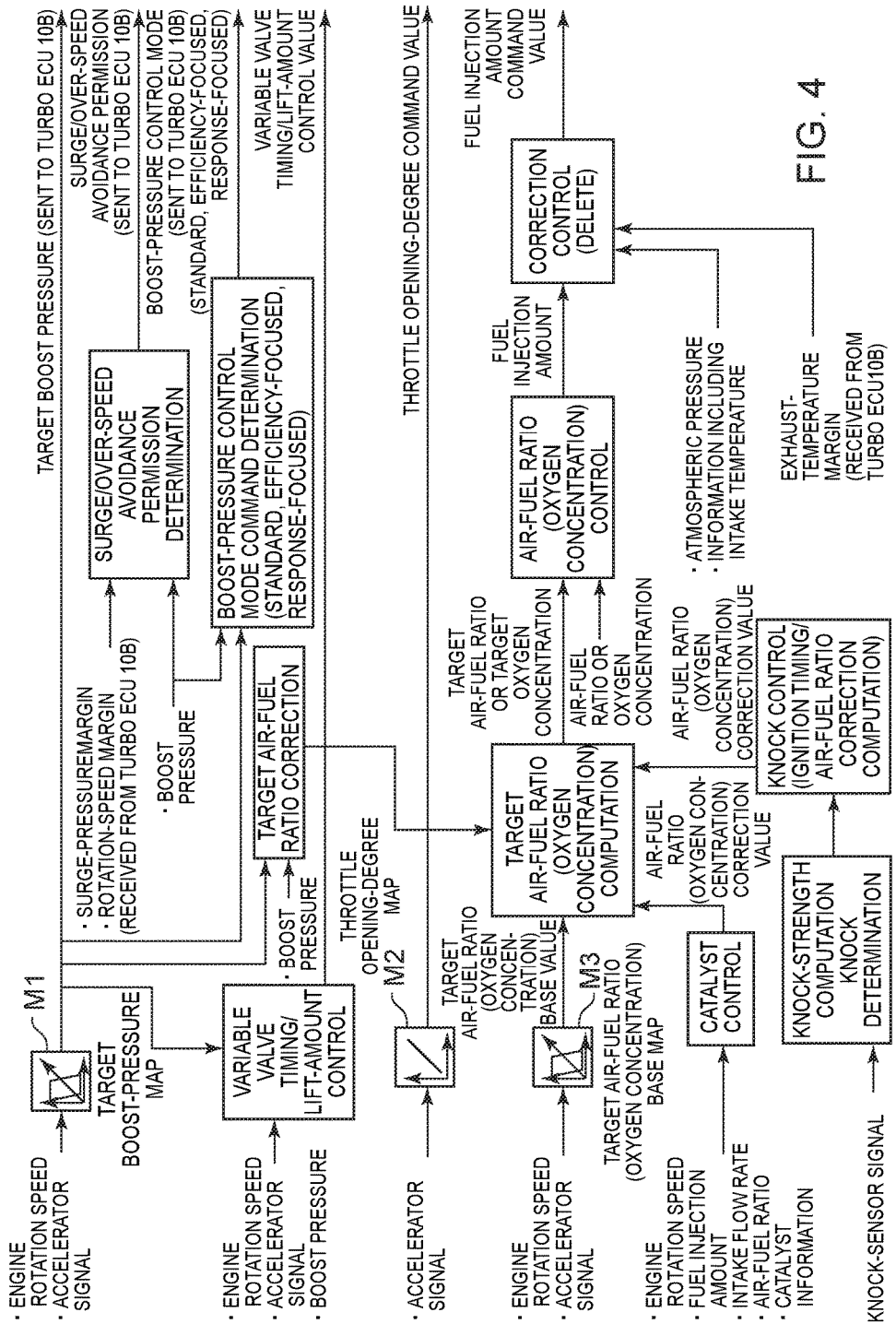
FIG. 4 is a block diagram for describing control logics of an engine ECU.

FIG. 4 is a block diagram for describing control logics of an engine ECU.

As illustrated in FIG. 4, the target boost-pressure computing part 10A2a computes a target boost pressure from an engine rotation speed, an accelerator signal, and a target boost-pressure map M1 in which a target boost pressure corresponding to an engine rotation speed and an accelerator signal is set. The computed target boost pressure is outputted from the engine-signal output part 10A3 to the turbo ECU 10B. Though not depicted, the turbo ECU 10B itself may include the target boost-pressure map M1, and compute a target boost pressure.

As illustrated in FIG. 4, the surge/over-speed permission determination part 10A2 compares a margin such as a surge-pressure margin and a rotation-speed margin computed by the turbo ECU 10B with a margin threshold specified in advance. If a margin such as a surge-pressure margin and a rotation-speed margin is smaller than a margin threshold, a signal related to permission to avoid surge/over-speed is transmitted to the turbo ECU 10. In response to a signal related to permission to avoid surge/over-speed from the engine ECU 10A, the turbo ECU 10B performs a control such that a response time before the boost pressure of the turbocharger 3 reaches a target boost pressure is longer than that in a case in which a margin is greater than a margin threshold. This control is performed, for instance, if a margin is smaller than a margin threshold (if the turbo ECU 10B receives a signal related to permission to avoid surge/over-speed) during a feedback control by a feedback control unit 32 described below, by reducing a control gain for a feedback control as compared to a case in which a margin is greater than a margin threshold.

Further, the above described margin threshold may be specified in advance as a constant value, or may be calculated each time in accordance with an operational state of the engine.

Figure 7A:
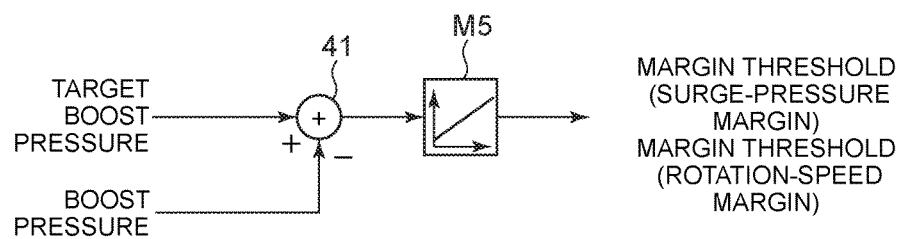
FIGS. 7A and 7B are block diagrams for describing calculation logics for calculating a margin threshold.
Figure 7B:
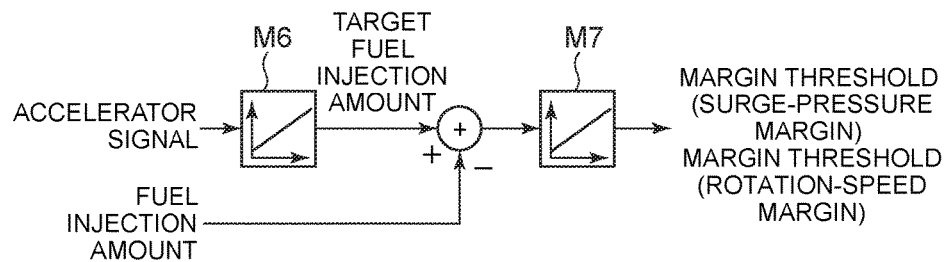

Specifically, as illustrated in FIG. 7A, a difference between a target boost pressure and an actual boost pressure of the turbocharger 3 may be calculated by an adder-subtractor 41, and a margin threshold may be calculated on the basis of a margin threshold map M5 to which the difference is inputted. Further, as illustrated in FIG. 7B, a difference between a target fuel-injection amount and an actual fuel-injection amount of the engine 2 may be calculated by an adder-subtractor 42, and a margin threshold may be calculated on the basis of a margin threshold map M7 to which the difference is inputted. In this case, a target fuel-injection amount can be calculated on the basis of a target fuel-injection amount map M6, to which an accelerator signal is inputted. With the above configuration, it is possible to set a suitable margin threshold in accordance with an actual operational state of the engine, by setting a larger margin threshold if a difference between a target boost pressure and an actual boost pressure is large or if a difference between a target fuel-injection amount and an actual fuel-injection amount is large, and by setting a smaller margin threshold if the difference is small.

As illustrated in FIG. 4, the boost-pressure control mode command determination part 10A2c recognizes one boost-pressure control mode selected from two or more boost-pressure control modes, and transmits the recognized boost-pressure control mode to the turbo ECU 10B. An operator can optionally select a boost-pressure control mode by operating a drive-mode switch or the like, for instance.

FIG. 8 is a compressor characteristic chart for describing boost-pressure control modes. Y-axis represents a pressure ratio of a pressure before a compressor to a pressure after a compressor, and x-axis represents an intake flow rate.

One of the following three modes can be set as a boost-pressure control mode, for instance: a response-focused mode for performing a boost-pressure control focused on responsiveness so as to achieve a target boost pressure quickly; an efficiency-focused mode for performing a boost-pressure control focused on fuel efficiency; and a standard mode for performing a boost-pressure control intermediate between the above two modes. In the above three boost-pressure control modes, a turbo-control-command-value computing part 10B2 performs a control such that operational points to be passed between a point S corresponding to a current boost pressure and a point G corresponding to a target boost pressure are different among the different control modes. Further, in any one of the boost-pressure control modes, a control is performed so that the pressure ratio does not exceed a surge pressure line.

In the engine-control-command-value computing part 10A2d, as illustrated in FIG. 4, a variable valve timing/lift amount command value is computed, the value being related to a valve timing or a valve lift amount of an intake-exhaust valve, from an engine rotation speed, an accelerator signal, and a boost pressure. Further, a throttle opening degree command value is computed from an accelerator signal and a throttle opening-degree map M2 in which a throttle opening-degree curve corresponding to an accelerator signal is set.

Further, as illustrated in FIG. 4, the engine-control-command-value computing part 10A2d computes a fuel-injection amount command value from an engine rotation speed, an accelerator signal, an intake flow rate, an air-fuel ratio, catalyst information, a knock-sensor signal and the like, as follows.

Specifically, a target air-fuel ratio base value is computed from an engine rotation speed, an accelerator signal, and a target air-fuel ratio base map M3 in which a target air-fuel ratio corresponding to an engine rotation speed and an accelerator signal is set. The target air-fuel ratio base value is corrected taking account of each of a boost-pressure control, a catalyst control, and a knock control, to compute a target air-fuel ratio. From the target air-fuel ratio and an air-fuel ratio detected by the air-fuel ratio sensor 21, a fuel-injection amount required to control to the target air-fuel ratio is computed. The computed fuel-injection amount is corrected by subtraction on the basis of an exhaust-temperature margin described below, to compute a fuel-injection amount command value. Subtracting correction is performed if an exhaust-temperature margin is smaller than a preset margin threshold, for instance. It should be noted that a target oxygen concentration and an oxygen concentration can be used instead of a target air-fuel ratio and an air-fuel ratio.

The computed engine control command values are outputted from the engine-signal output part 10A3 to various devices.

As illustrated in FIG. 3, to the turbo-signal input part 10B1 of the turbo ECU 10B, at least sensor signals related to an operational state of the turbocharger 3 are inputted from the various devices, the sensor signals including an engine rotation speed, an accelerator signal, a turbo rotation speed, a boost pressure, an intake flow rate, and an exhaust temperature. The above sensor signals may be directly inputted from the various sensors, or via the engine ECU 10A. Further, a target boost pressure computed by the engine ECU 10A is inputted to the turbo-signal input part 10B1 of the turbo ECU 10B.

The engine ECU 10A, the turbo ECU 10B, the various sensors, and the various devices, are connected to each other to be communicable via CAN.

The turbo control part 10B2 of the turbo ECU 10B includes a turbo-control-command-value computing part 10B2a which computes a turbo control command value corresponding to a target boost pressure of the turbocharger 3, a margin computing part 10B2b which computes a margin such as a surge-pressure margin and a rotation-speed margin, and an exhaust-temperature margin computing part 10B2c which computes an exhaust-temperature margin.

Figure 5:
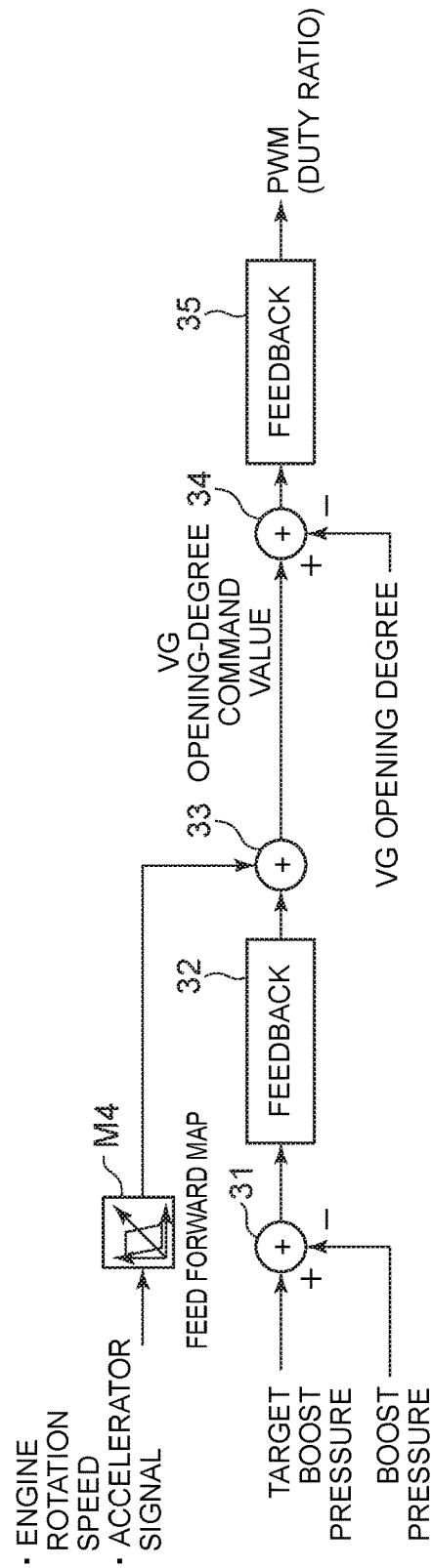
FIG. 5 is a block diagram for describing control logics of a turbo ECU.

FIG. 5 is a block diagram for describing control logics of a turbo ECU.

As illustrated in FIG. 5, the turbo-control-command-value computing part 10B2a calculates a difference between a target boost pressure and an actual boost pressure with an adder-subtractor 31. On the basis of the calculated difference and a control gain determined in advance, the feedback control unit 32 computes a VG opening-degree command value. At this time, it is possible to improve control responsiveness by adding a value calculated by a feed forward map M4 to which an engine rotation speed and an accelerator signal are inputted to the VG opening-degree command value computed by the feedback control unit 32. Further, a difference between the VG opening-degree command value calculated by an adder 33 and an actual VG opening degree is calculated by an adder-subtractor 34, and a PWM signal for controlling the VG opening degree is generated by the feedback control unit 35 on the basis of the calculated difference.

Further, in a feedback control performed by the feedback control unit 32, it is possible to perform a boost-pressure control corresponding to a selected boost-pressure control mode by using a different control gain in accordance with one boost-pressure control mode recognized by the above described boost-pressure control mode command determination part 10A2c. For instance, in the above described three boost-pressure control modes including the response-focused mode, the efficiency-focused mode, and the standard mode, the control gain may be set so as to be greater in an order of: the response-focused mode>the standard mode>the efficiency-focused mode, which makes it possible to perform a boost-pressure control corresponding to the selected boost-pressure control mode.

Figure 9:
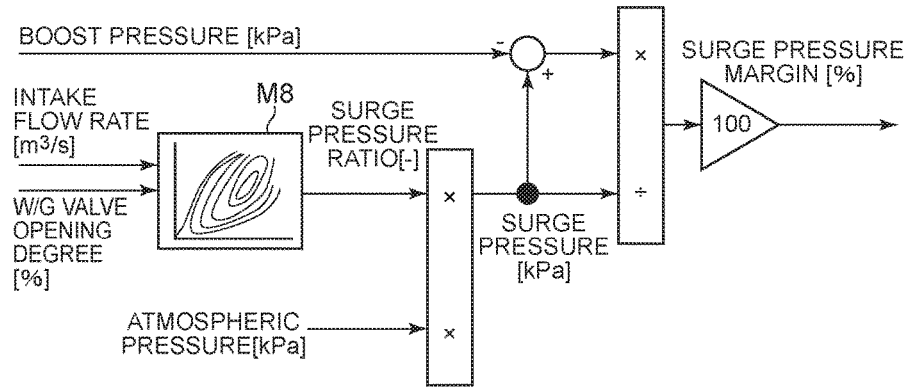
FIG. 9 is a diagram for describing computational logics for computing a surge-pressure margin.
Figure 10A:
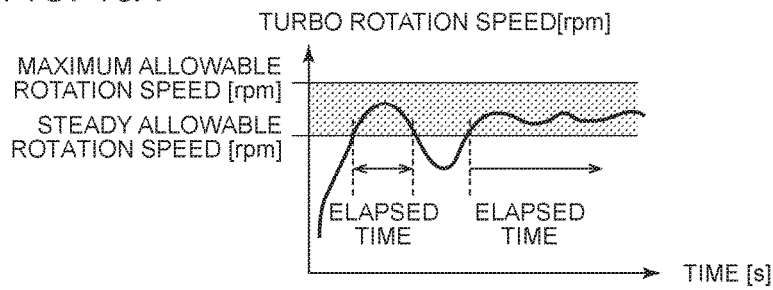
FIGS. 10A and 10B are diagrams for describing computational logics for computing a rotation-speed margin.
Figure 10B:
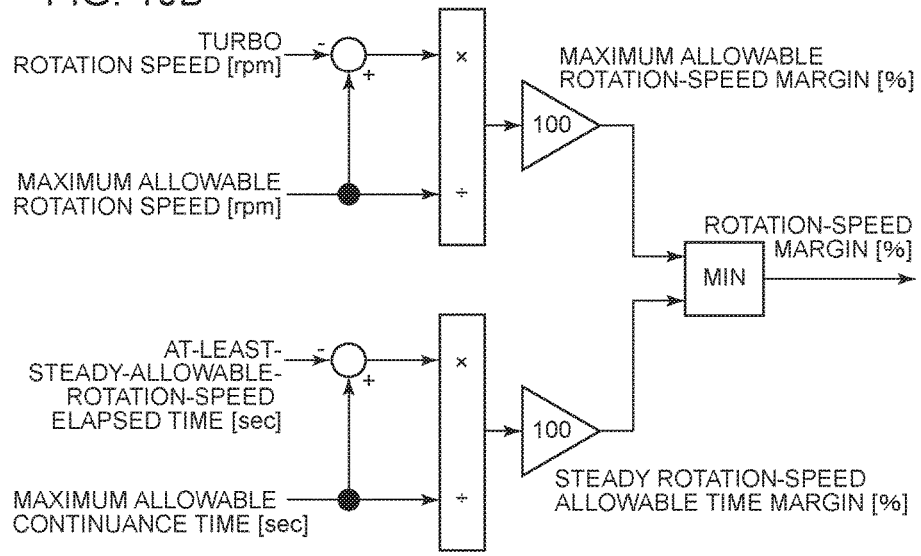

FIG. 9 is a diagram for describing computational logics for computing a surge-pressure margin, and FIG. 10 is a diagram for describing computational logics for computing a rotation-speed margin.

The margin computing part 10B2b computes a surge-pressure margin in accordance with the computational logics illustrated in FIG. 9. To compute a surge-pressure margin, firstly, an intake flow rate is inputted to a surge-pressure map M8 to calculate a surge pressure ratio, and the surge pressure ratio is multiplied by an atmospheric pressure to obtain a surge pressure. The surge pressure represents a limit pressure at which surging occurs. From the calculated surge pressure and a boost pressure detected by the pressure sensor 22, a surge-pressure margin represented by the following expression (1) is computed:

Surge-pressure margin (%)=(Surge pressure−boost pressure)/surge pressure×100  (1)

As described above, a surge-pressure margin is defined as a ratio of a difference between the surge pressure and a boost pressure to a surge pressure, which makes it possible to prevent surging securely and to control the boost-pressure control unit accurately in the above described determination of permission to avoid surge/over-speed.

Further, the margin computing part 10B2b computes a rotation-speed margin in accordance with the computational logics illustrated in FIG. 10. A rotation-speed margin is computed as a smaller one of the maximum allowable rotation-speed margin and a steady rotation-speed allowable time margin. Here, the maximum allowable rotation-speed margin refers to a margin with respect to the maximum allowable rotation speed that the turbocharger 3 can tolerate, as represented by the following expression (2).

Maximum allowable rotation-speed margin (%)= (Maximum allowable rotation speed−turbo rotation speed)/Maximum allowable rotation speed× 100  (2)

Further, the steady rotation-speed allowable time margin is expressed by the following expression (3) using an elapsed time shown in FIG. 10A during which the turbo rotation speed of the turbocharger 3 does not exceed the maximum allowable rotation speed but continuously exceeds a steady allowable rotation speed (at-least-steady-allowable-rotation-speed elapsed time), and the maximum allowable continuance time, which is a limit time that continuous excess of the steady allowable rotation speed is permitted.

Steady rotation-speed allowable time margin (%)= (Maximum allowable continuance time−at-least-steady-allowable-rotation-speed elapsed time)/ maximum allowable continuance time×100  (3)

With the rotation-speed margin defined as described above being included in a margin, it is possible to prevent over-speed of the turbocharger 3 along with surging, during the above described determination of permission to avoid surge/over-speed. Further, with the rotation-speed margin being defined as the smaller one of the maximum allowable rotation-speed margin or the steady rotation-speed allowable time margin, the turbocharger 3 does not exceed the maximum allowable rotation speed, but is permitted to exceed the steady allowable rotation speed (rated rotation speed of the turbocharger 3) temporarily. In this way, it is possible to perform a control such that performance of the turbocharger 3 is maximized.

Figure 11A:
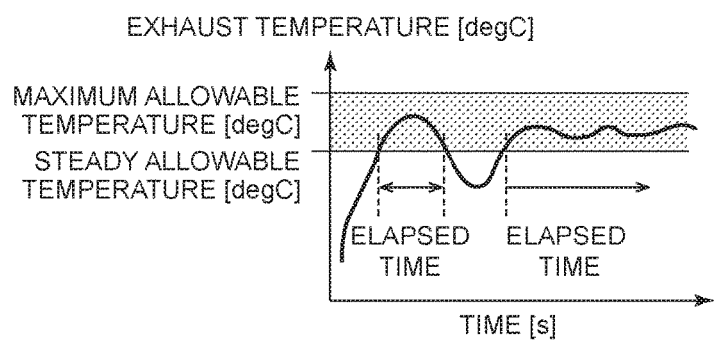
FIGS. 11A and 11B are diagrams for describing computational logics for computing an exhaust-temperature margin.
Figure 11B:
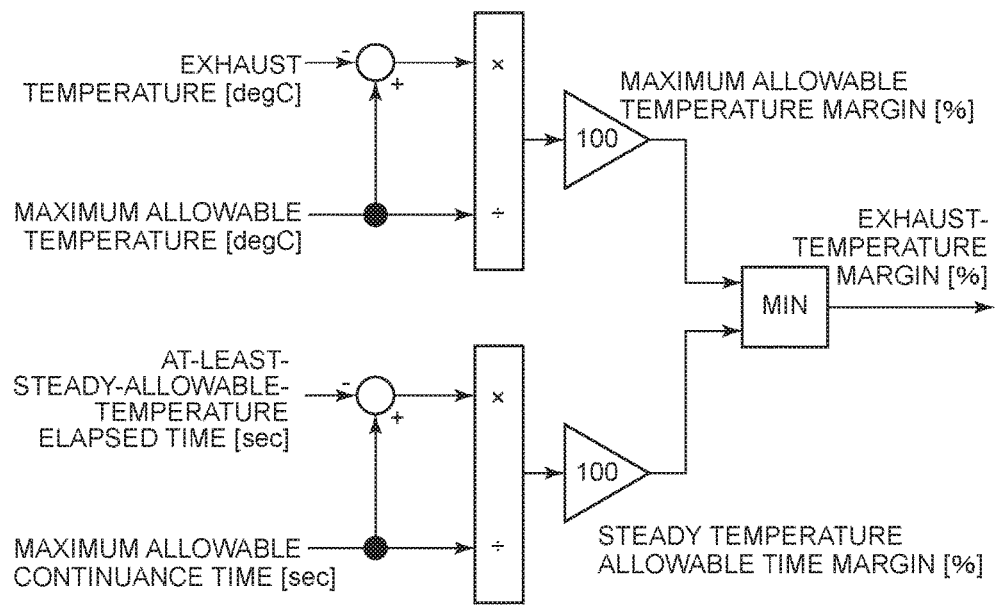

FIG. 11 is a diagram for describing computational logics for computing an exhaust-temperature margin.

The exhaust-temperature margin computing part 10B2c computes an exhaust-temperature margin in accordance with the computational logics illustrated in FIG. 11. An exhaust-temperature margin is computed as the smaller one of the maximum allowable temperature margin and the steady temperature allowable time margin. The maximum allowable temperature margin refers to a margin with respect to the maximum allowable temperature that the turbine 3b of the turbocharger 3 can tolerate, as represented by the following expression (4).

Maximum allowable temperature margin (%)=(Maximum allowable temperature−exhaust temperature)/Maximum allowable temperature×100     (4)

Further, the steady temperature allowable time margin is expressed by the following expression (5) using an elapsed time shown in FIG. 11A during which the turbine 3b of the turbocharger 3 does not exceed the maximum allowable temperature but continuously exceeds a steady allowable temperature (at-least-steady-allowable-temperature elapsed time), and the maximum allowable continuance time, which is a limit time that continuous excess of the steady allowable temperature is permitted.

Steady temperature allowable time margin (%)= (Maximum allowable continuance time−at-least-steady-allowable-temperature elapsed time)/ maximum allowable continuance time×100     (5)

With the exhaust-temperature margin being determined as described above, it is possible to prevent damage to the turbine 3b of the turbocharger 3 due to an excessively-increased exhaust temperature. Further, with the exhaust-temperature margin being defined as the smaller one of the maximum allowable temperature margin or the steady temperature allowable time margin, the turbine 3b does not exceed the maximum allowable temperature, but is permitted to exceed the steady allowable temperature (rated temperature of the turbine 3b) temporarily. In this way, it is possible to perform a control such that performance of the engine 2 is maximized.

Figure 6:
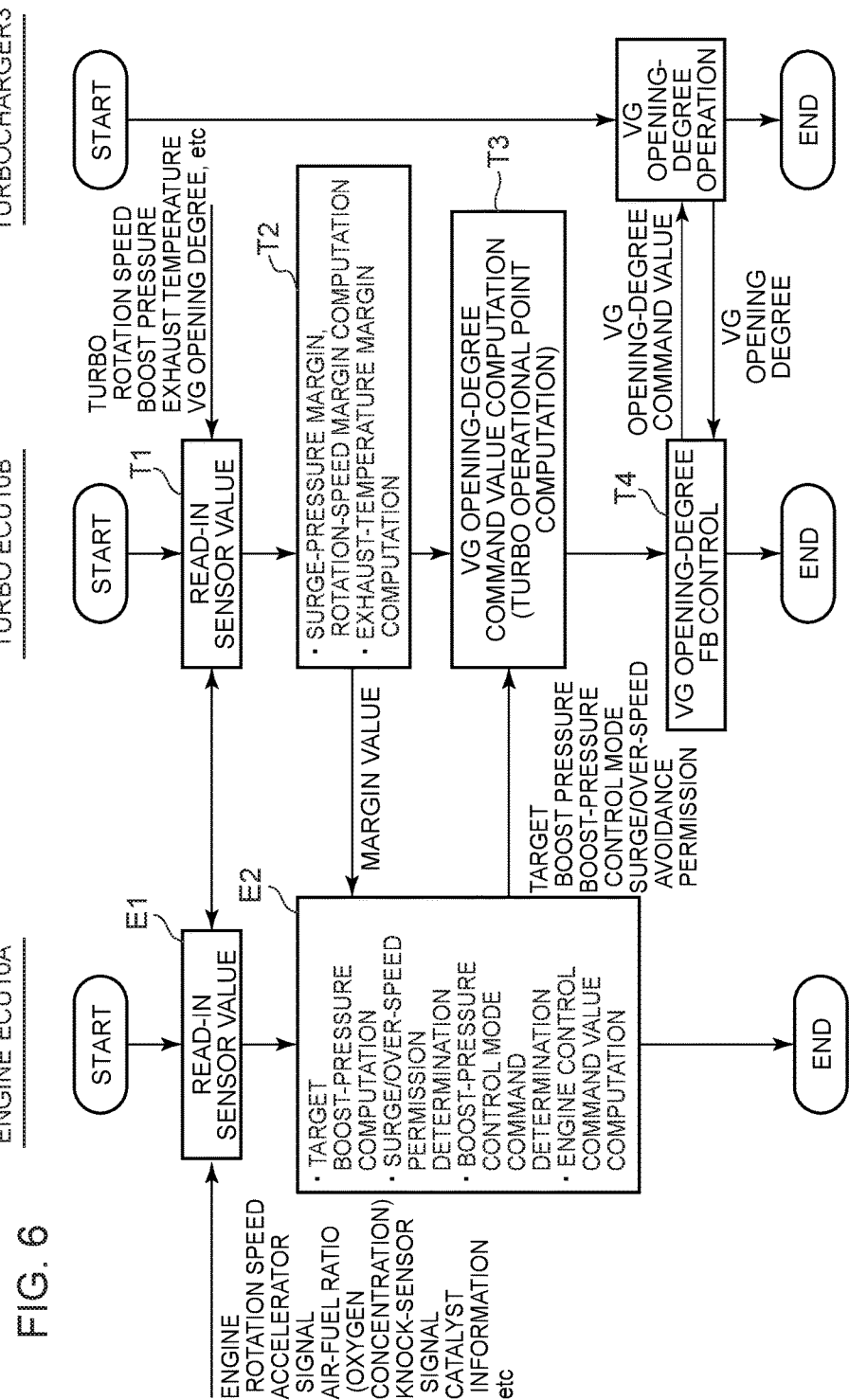
FIG. 6 is a control flowchart of a boost-pressure control unit according to the first embodiment.

FIG. 6 is a control flowchart of a boost-pressure control unit according to the first embodiment.

As illustrated in FIG. 6, the engine ECU 10A reads in the above described various sensor signals (step E1), and then computes engine-control command values for the various devices, such as a target boost pressure, a variable valve timing, a throttle opening degree, a fuel-injection amount, and the like. Further, on the basis of a surge pressure margin and a rotation-speed margin transmitted from the turbo ECU 10B, permission or non-permission of a control for the variable control mechanism 3d of the turbocharger 3 (permission to avoid surge/over-speed) is determined. Further, selected one boost-pressure control mode is recognized. The above target boost pressure, signals related to permission to avoid surge/over-speed, and the boost-pressure control mode are transmitted to the turbo ECU 10B (step E2).

Further, the turbo ECU 10B reads in the above described various sensor signals parallel to the control by the engine ECU 10A (step T1), and then computes a margin such as a surge pressure margin and a rotation-speed margin, and an exhaust-temperature margin (step T2). The computed surge-pressure margin, over-speed rotation margin, and exhaust-temperature margin are each outputted to the engine ECU 10A. Further, the turbo ECU 10B computes a VG opening-degree command value on the basis of a target boost pressure transmitted from the engine ECU 10A, according to the control logics illustrated in FIG. 5 (T3). At this time, as described above, a control gain is set so that a turbo operational point corresponding to the selected boost-pressure control mode is computed. Finally, a feedback control is performed so that the VG opening degree of the variable control mechanism 3d matches the VG opening-degree command value (T4).

The control device 10 with the above configuration for a supercharging system, according to the present embodiment, includes the turbo ECU 10B having a control part and a signal input part provided separately and independently from the engine ECU 10A, as described above. The turbo ECU 10B is a controller which basically controls only the variable control mechanism 3d of the turbocharger 3, unlike the engine ECU 10A, which simultaneously controls a plurality of devices including a fuel-injection device, an intake-exhaust valve, an ignition device, a catalyst device, and the like. Thus, with the turbo control part 10B2 of the turbo ECU 10B computing a VG opening-degree command value (turbo control command value), which is outputted to the variable control mechanism 3d (boost-pressure control unit) of the turbocharger 3, it is unnecessary to communicate with the engine ECU 10A to control the variable control mechanism 3d, which makes it possible to control a boost pressure quickly while avoiding an influence from delay in communication with the engine 10A.

Further, the control device 10 for a supercharging system according to the present embodiment is configured such that, if a margin is smaller than a margin threshold, a response time before the boost pressure of the turbocharger 3 reaches a target boost pressure is longer than that in a case in which a margin is greater than a margin threshold. Thus, surging is prevented in a state in which there is no margin with respect to surging, such as when a margin is smaller than a margin threshold, which makes it possible to reduce abnormal operation of the turbocharger 3. Further, since a margin is computed by the turbo ECU 10B with a control part and an input part provided separately and independently from the engine ECU 10A, it is possible to compute a margin accurately at a high speed as compared to a case in which a margin is computed by the engine ECU 10A.

Second Embodiment

Figure 12:
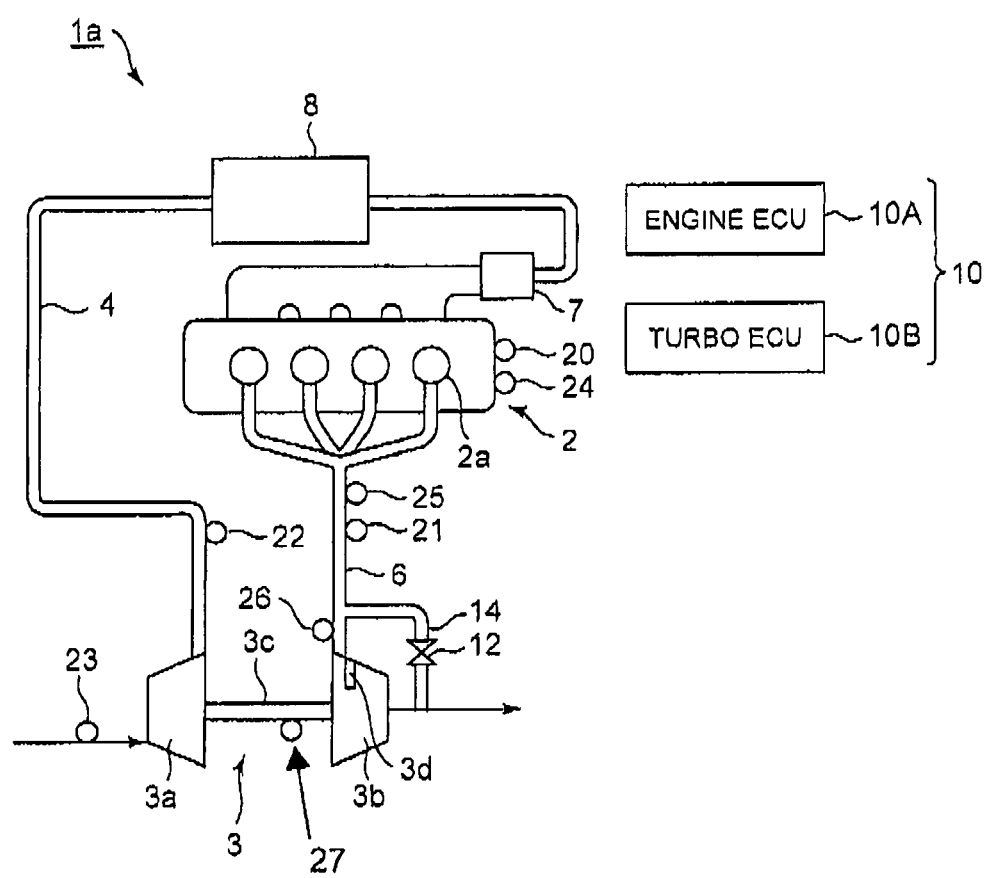
FIG. 12 is an overall configuration diagram of an engine system to which a control device for a supercharging system according to the second embodiment of the present invention is to be applied.

FIG. 12 is an overall configuration diagram of an engine system to which a control device of a supercharging system according to the second embodiment of the present invention is to be applied. The engine system 1a of the present embodiment is basically similar to the engine system 1 of the embodiment illustrated in FIG. 1 in terms of configuration, except that the engine system 1a includes the bypass channel 14 and a waste-gate valve 12. Thus, the same component is associated with the same reference numeral and not described in detail.

As illustrated in FIG. 12, the bypass channel 14 is connected to the exhaust duct 6 so as to bypass the turbine 3b of the turbocharger 3. The waste-gate valve 12 is disposed in the bypass channel 14, and a flow rate of exhaust gas flowing through the turbine 3b and a flow rate of exhaust gas flowing through the bypass channel 14 can be controlled by adjusting the opening degree of the waste-gate valve 12. Through control of a flow rate of exhaust gas flowing through the turbine 3b, it is possible to control the rotation speed of the turbine 3b and the rotation speed of the compressor 3a driven coaxially with the turbine 3b. The rotation speed of the turbocharger 3 is detected by a turbo rotation speed sensor 27.

In other words, in the present embodiment, the above described variable control mechanism 3d and the waste-gate valve 12 both correspond to a boost-pressure control unit to control a boost pressure of intake air compressed by the compressor 3a. The WG valve opening degree of the waste-gate valve 12 is controlled by the control device 10, similarly to the VG opening degree of the variable control mechanism 3d. It should be noted that the turbocharger 3 may not be provided with the variable control mechanism 3d if the waste-gate valve 12 is to be solely controlled.

Figure 13:
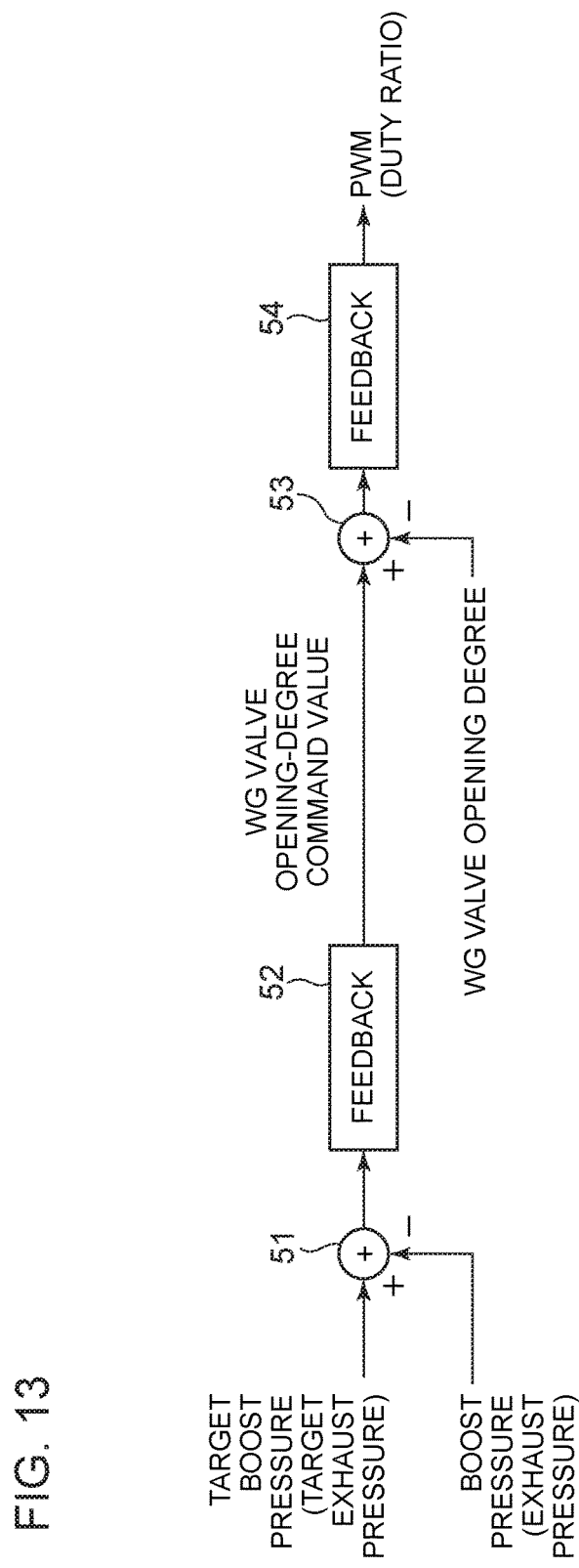
FIG. 13 is a block diagram for describing a working example of one of control logics of a turbo ECU according to the second embodiment.
Figure 14B:
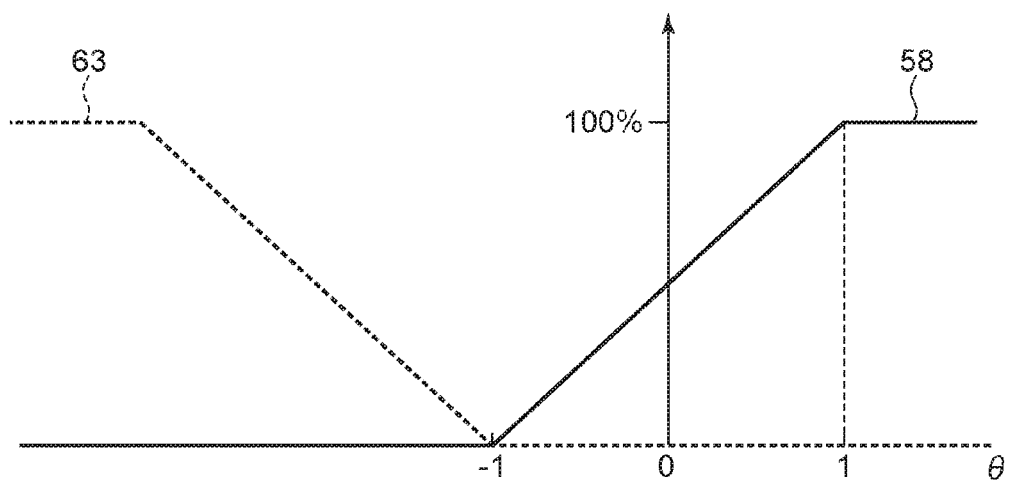
FIG. 14B is a diagram for describing control logics in FIG. 14A.

FIGS. 13 to 14B are block diagrams for describing control logics of a turbo ECU in the second embodiment. FIG. 13 is a diagram showing a control logic for controlling only the waste-gate valve 12, and FIG. 14A is a diagram showing a control logic for controlling both of the waste-gate valve 12 and the variable mechanism 3d. FIG. 14B is a diagram for describing control logics in FIG. 14A.

In the control logic illustrated in FIG. 13, firstly, a difference between a target boost pressure and an actual boost pressure is calculated by an adder-subtractor 51. On the basis of the calculated difference and a control gain determined in advance, the feedback control unit 52 computes a WG valve opening-degree command value. Further, a difference between the computed WG valve opening-degree command value and an actual WG valve opening degree is calculated by an adder-subtractor 53, and a PWM signal for controlling the WG valve opening degree is generated by the feedback control unit 54 on the basis of the calculated difference.

The control logics illustrated in FIG. 14A can be roughly divided into a control logic (A) for a VG opening degree depicted in the upper section of the drawing, and a control logic (B) for a WG valve opening degree depicted in the lower section of the drawing.

In the control logic (A) for a VG opening degree, a difference between a target boost pressure and an actual boost pressure is firstly calculated by an adder-subtractor 55. On the basis of the calculated difference and a control gain determined in advance, a feedback control unit 56 computes a VG opening-degree command value. At this time, it is possible to improve control responsiveness by adding a value calculated by a feed forward map M9 to which an engine rotation speed and an accelerator signal are inputted to the VG opening-degree command value computed by a feedback control unit 56. The VG opening-degree command value calculated by the adder 57 is outputted to a limiter 58 or a limiter 63. The limiter 58 and the limiter 63 are linearized tables with a limiter. As illustrated in FIG. 14B, when an expression of $\theta \geq -1$ is satisfied, the WG valve opening degree is fixed to a limiter lower limit so that only the VG opening degree changes, and when an expression of $\theta < -1$ is satisfied, the VG valve opening degree is fixed to a limiter lower limit so that only the WG valve opening degree changes. In a normal operation range ($\theta \geq -1$), the WG valve opening degree is fixed to a limiter lower limit and the VG opening degree is controlled, thereby controlling a boost pressure. In this case, the VG opening-degree command value calculated by the adder 57 is outputted from the limiter 58 to an adder-subtractor 59. Further, a difference between the VG opening-degree command value outputted by the limiter 58 and an actual VG opening degree is calculated by the adder-subtractor 59, and a PWM signal for controlling the VG opening degree is generated by the feedback control unit 60 on the basis of the calculated difference.

In the control logic (B) for a WG valve opening degree, a difference between a target boost pressure and an actual boost pressure is firstly calculated by an adder-subtractor 61. On the basis of the calculated difference and a control gain determined in advance, a feedback control unit 62 computes a WG valve opening-degree command value and outputs the WG valve opening-degree command value to a computing processor 64. Further, if a boost pressure is extremely higher than a target boost pressure ($\theta < -1$), the VG opening degree is fixed to a limiter lower limit, and the WG valve opening degree is controlled to control a boost pressure. In this case, the VG opening-degree command value calculated by the adder 57 is outputted from the limiter 63 to the computing processor 64.

The computing processor 64 computes a WG valve opening-degree command value corresponding to an output value from the limiter 63. The greater one of the computed WG valve opening-degree command value or the WG valve opening-degree command value outputted from the feedback control unit 62 is outputted to an adder-subtractor 65 as a WG valve opening-degree command value. If the VG opening-degree command value is not inputted from the limiter 63, output to the adder-subtractor 65 is not performed. Further, a difference between the WG valve opening-degree command value outputted by the computing processor 64 and an actual WG valve opening degree is calculated by the adder-subtractor 65, and a PWM signal for controlling the WG valve opening degree is generated by a feedback control unit 66 on the basis of the calculated difference.

Here, a boost-pressure control by the variable control mechanism 3d is configured so that control responsiveness is higher than that of a boost-pressure control by the waste-gate valve 12. Specifically, in the control logic illustrated in FIG. 14, a control gain set for the feedback control unit 56 in the control logic (A) for a VG opening degree is larger than that for the feedback control unit 62 in the control logic (B) for a WG valve opening degree. Moreover, in the control logic (A) of a VG opening degree, an output value from the feed forward map M9 is added to a VG opening-degree command value computed by the feedback control unit 56, which increases the control responsiveness even further.

In the control logics illustrated in FIGS. 13 to 14B, a WG valve opening-degree command value may be computed by a feedback control on the basis of a difference between a target exhaust pressure and an actual exhaust pressure. In an engine system without a bypass channel disposed on the side of a compressor, a boost pressure and an exhaust pressure have a strong correlation. Thus, it is possible to control a boost pressure to a target boost pressure by controlling an exhaust pressure with the waste-gate valve 12. In this case, a target exhaust pressure is set as a value corresponding to a target boost pressure. An actual exhaust pressure is detected by a pressure sensor 26 disposed on a downstream side of a branch position of the bypass channel 14 in the exhaust duct 6.

Figure 15:
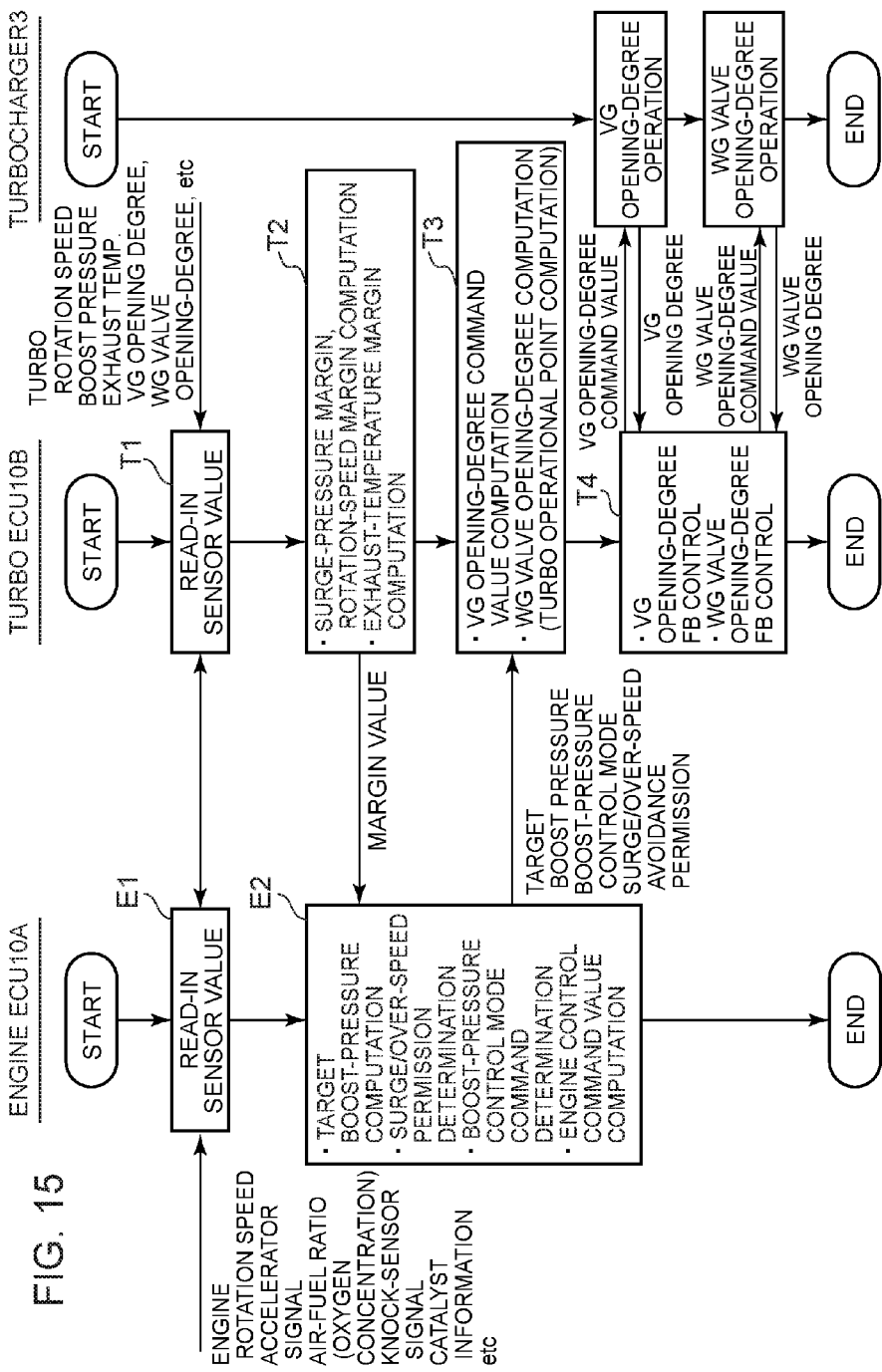
FIG. 15 is a control flowchart of a boost-pressure control unit according to the second embodiment.

FIG. 15 is a control flowchart of a boost-pressure control unit according to the second embodiment. The present flowchart is substantially similar to the control flowchart in the above described first embodiment, but is different from the first embodiment in that, not only a VG opening-degree command value but also a WG valve opening-degree command value is computed in step T3, and not only a VG opening degree but also a WG valve opening degree is controlled in step T4.

According to the above embodiment, the boost pressure of the turbocharger 3 is controlled by adjusting a VG opening degree of the variable control mechanism 3d being a boost-pressure control unit and a WG valve opening degree of the waste-gate valve 12 being a boost-pressure control unit, which makes it possible to prevent surging in advance while suppressing rapid fluctuation of a boost pressure.

Further, as described above, a boost-pressure control by the variable control mechanism 3d is configured so that control responsiveness is higher than that of a boost-pressure control by the waste-gate valve 12, which makes it possible to control a boost pressure efficiently and over a broad range.

Third Embodiment

Figure 16:
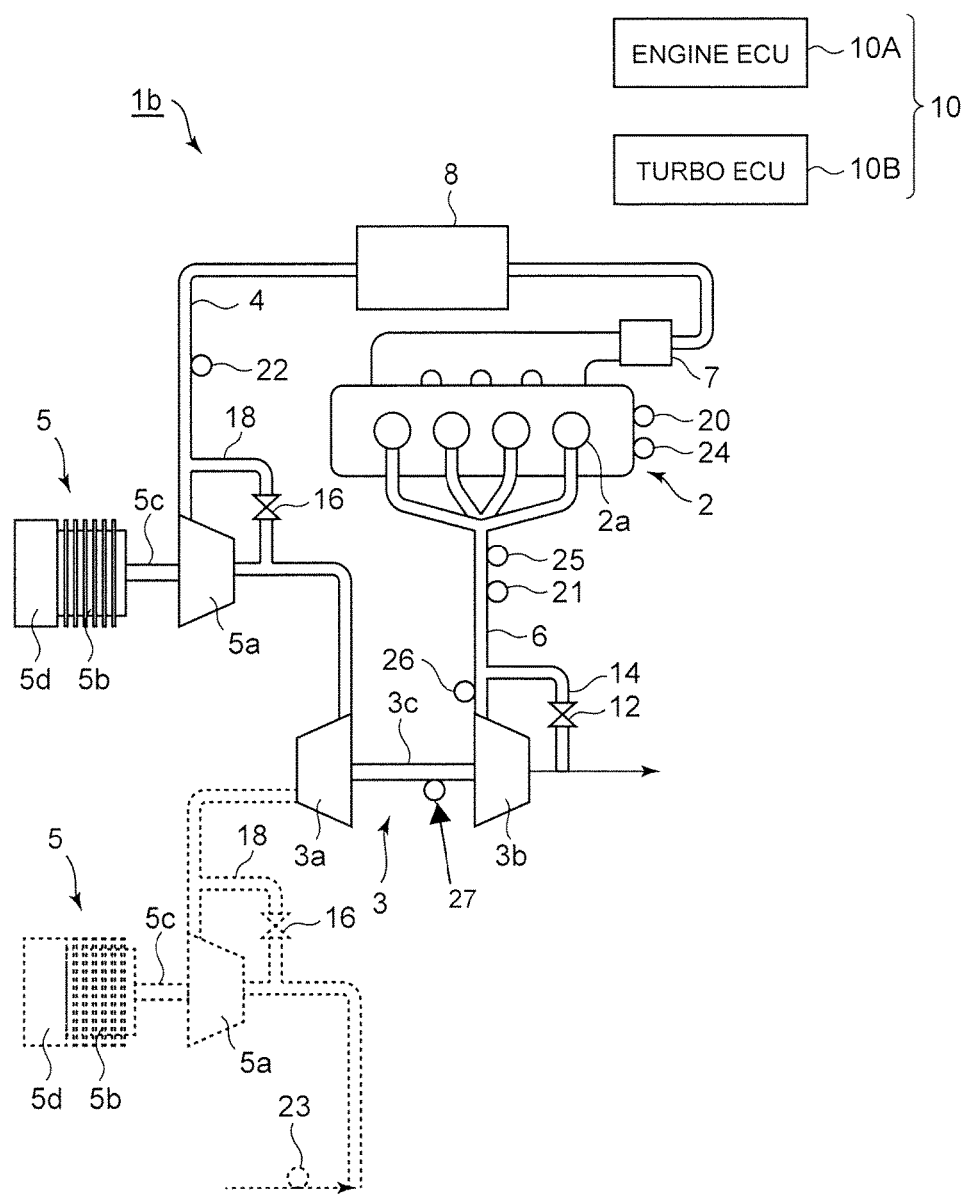
FIG. 16 is an overall configuration diagram of an engine system to which a control device for a supercharging system according to the third embodiment of the present invention is to be applied.

FIG. 16 is an overall configuration diagram of an engine system to which a control device of a supercharging system according to the third embodiment of the present invention is to be applied. The engine system 1b of the present embodiment basically has a similar configuration to that of the engine system of the above described embodiment, except that the engine system 1b includes an electric turbocharger 5 and an intake-side bypass channel 18. Thus, the same component is associated with the same reference numeral and not described in detail.

As illustrated in FIG. 16, the electric turbocharger 5 includes an electric compressor 5a disposed in the intake duct 4 on a downstream side of the compressor 3a of the turbocharger 3, a motor 5b which drives the electric compressor 5a to rotate, a rotor 5c coupling the electric compressor 5a and the motor 5b, and an inverter 5d (rotation-speed control unit) for controlling the rotation speed of the motor 5b. Intake air flowing into the electric compressor 5a is compressed by driving the electric compressor 5a to rotate with the motor 5b. That is, in the present embodiment, a supercharger which compresses intake air to be supplied to the engine 2 includes the turbocharger 3 and the electric turbocharger 5. Further, FIG. 16 shows, in broken lines, the electric turbocharger including an electric compressor 5a disposed on an upstream side of the compressor 3a of the turbocharger 3 as an alternative example.

An intake-side bypass channel 18 is connected to the intake duct 4 so as to bypass the electric compressor 5a of the electric turbocharger 5. Further, a bypass valve 16 is disposed in the intake-side bypass channel 18, and the bypass valve 16 is opened and closed so as to control whether intake air flows into the electric compressor 5a.

In other words, in the present embodiment, the above described waste-gate valve 12 corresponds to a boost-pressure control unit to control a boost pressure of the compressor 3a. Further, the above described inverter 5d corresponds to a boost-pressure control unit to control a boost pressure of the electric compressor 5a. The inverter 5d and the bypass valve 16 are controlled by the control device 10, similarly to the WG valve opening degree of the waste-gate valve 12.

Figure 17:
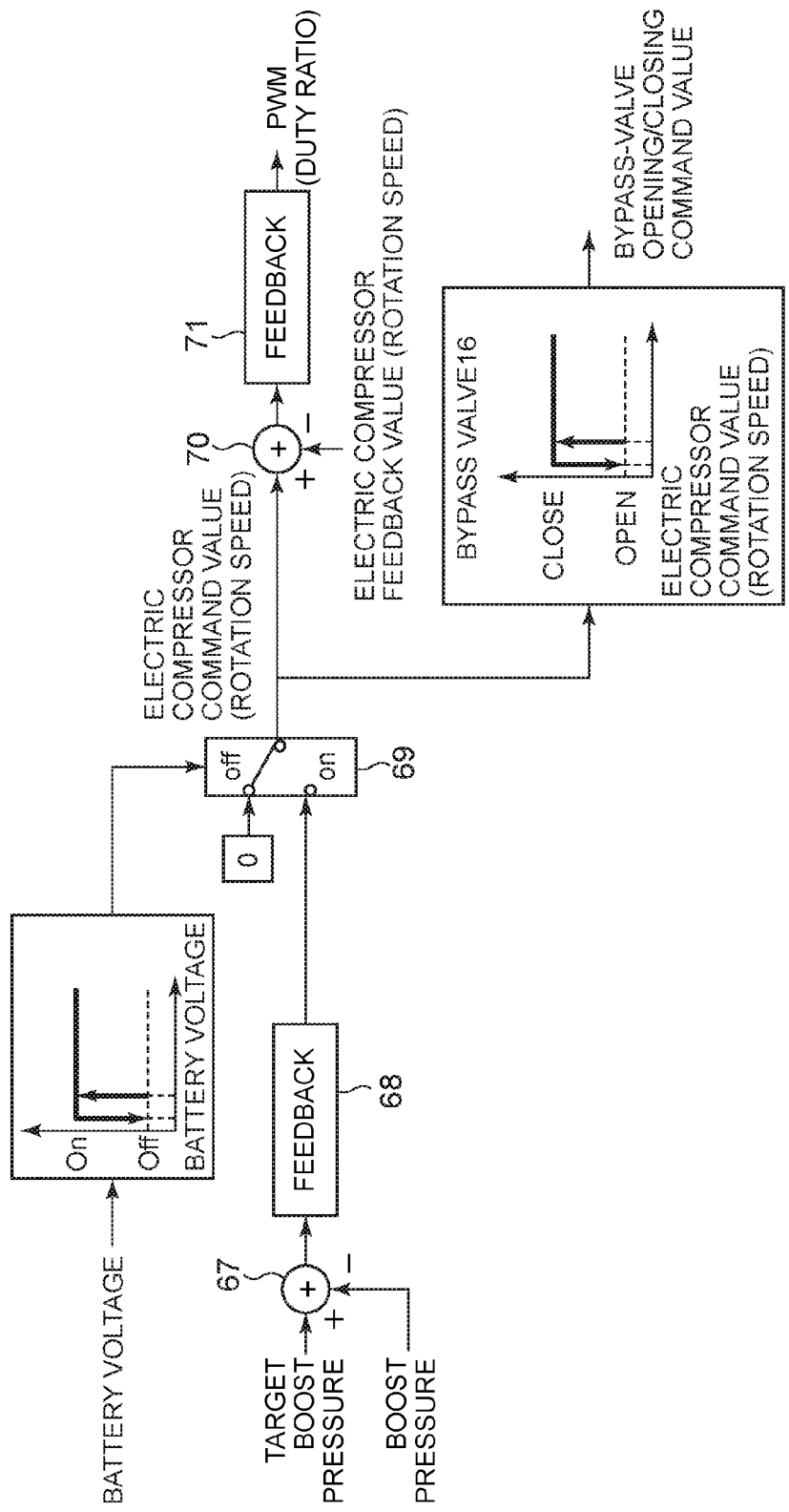
FIG. 17 is a block diagram for describing control logics of a turbo ECU according to the third embodiment.

FIG. 17 is a block diagram for describing control logics of a turbo ECU according to the third embodiment. The turbo ECU 10B also computes a WG valve opening-degree command value for the waste-gate valve 12, in addition to an electric-compressor command value for the inverter 5d and an opening-closing command value for the bypass valve 16. Nevertheless, a computational logic of the WG valve opening-degree command value is similar to the control logic illustrated in FIG. 13, and not mentioned in the description of FIG. 17.

In the control logic illustrated in FIG. 17, a difference between a target boost pressure and an actual boost pressure is firstly calculated by an adder-subtractor 67. On the basis of the calculated difference and a control gain determined in advance, the feedback control unit 68 computes an electric-compressor command value (rotation speed). The electric-compressor command value computed by the feedback control unit 68 is outputted to a switch 69. The switch 69 outputs the electric-compressor command value outputted from the feedback control unit 68 to an adder-subtractor 70 if the switch is ON. If the switch is OFF, the switch 69 does not output the electric-compressor command value outputted by the feedback control unit 68 to the adder-subtractor 70 (zero output). The ON/OFF of the switch is switched in accordance with a voltage (battery voltage) supplied to the motor 5b. If a voltage of at least a predetermined voltage required for operation of a motor is supplied to the motor 5b, the switch is ON, and if only a voltage below the predetermined voltage is supplied to the motor 5b, the switch is OFF. Further, a difference between the electric-compressor command value outputted by the switch 70 and an electric-compressor feedback value is calculated by an adder-subtractor 70, and a PWM signal for controlling an electric-compressor rotation speed is generated by the feedback control unit 71 on the basis of the calculated difference.

Further, in the control logic illustrated in FIG. 17, an opening-closing command value for the bypass valve 16 is also generated. The bypass valve 16 is controlled to be fully closed when the electric turbocharger 5 is operating and to be fully open when the electric turbocharger 5 is not operating.

Figure 18:
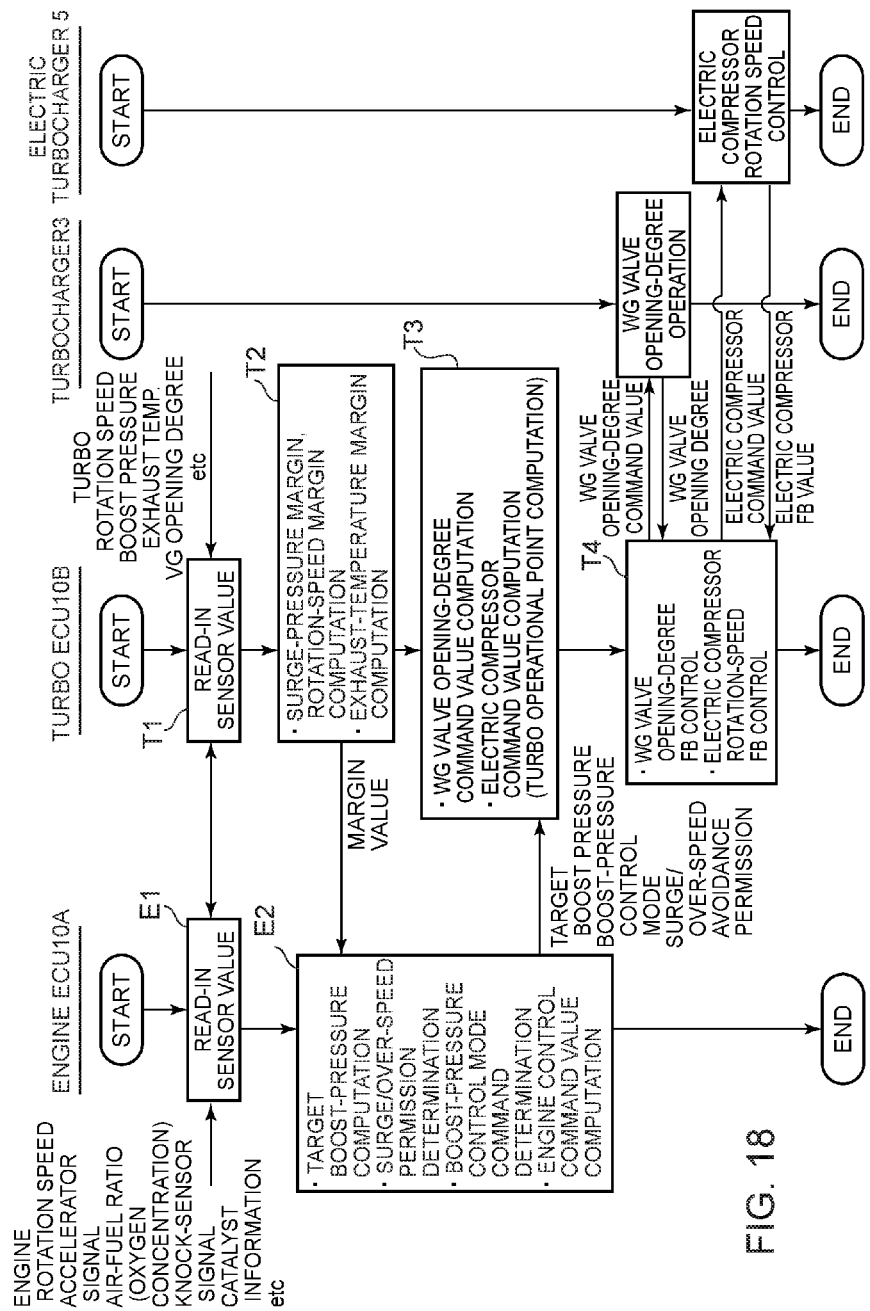
FIG. 18 is a control flowchart of a boost-pressure control unit according to the third embodiment.

FIG. 18 is a control flowchart of a boost-pressure control unit according to the third embodiment. The present flowchart is substantially similar to the control flowchart in the above described first and second embodiments, but is different from the first and second embodiments in that, not only a WG valve opening-degree command value but also an electric-compressor command value is computed in step T3, and not only a WG valve opening degree but also an electric-compressor rotation speed is controlled in step T4.

According to the present embodiment, in a two-stage supercharging system including the turbocharger 3 and the electric turbocharger 5, the WG valve opening degree of the waste-gate valve 12 being a boost-pressure control unit for the turbocharger 3 is adjusted, and the rotation speed of the motor 5b is controlled by the inverter 5d (rotation-speed control unit) being a boost-pressure control unit for the electric turbocharger 5, and thereby boost pressures of the turbocharger 3 and the electric turbocharger 5 are controlled individually, which makes it possible to prevent surging in advance while suppressing rapid fluctuation of the boost pressure.

In the above embodiment, the electric turbocharger 5 is disposed on a high-pressure stage side. However, the turbocharger 3 and the electric turbocharger 5 may be swapped and the electric turbocharger 5 may be disposed on a low-pressure stage side. Further, the turbocharger 3 of the present embodiment may comprise a variable geometry turbocharger including the variable control mechanism 3d to be combined with the above described second embodiment.

Fourth Embodiment

Figure 19:
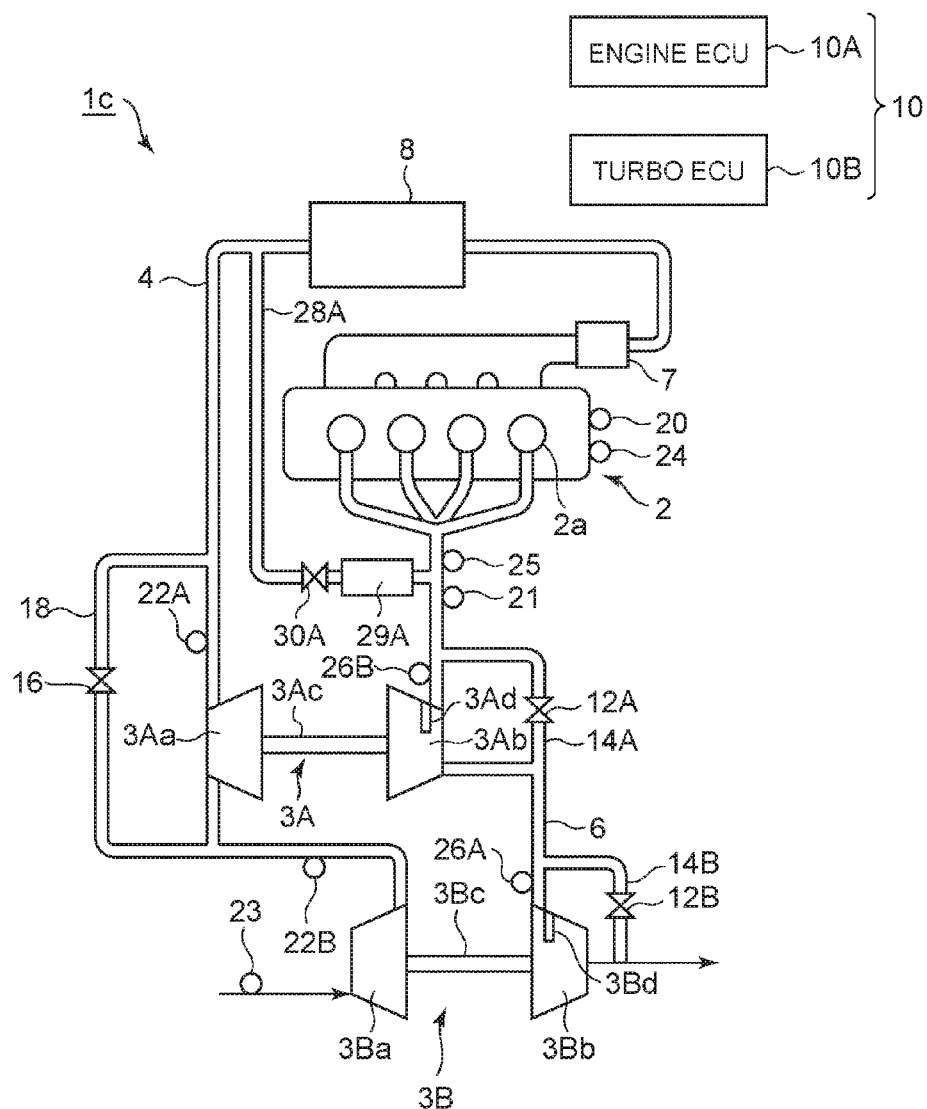
FIG. 19 is an overall configuration diagram of an engine system to which a control device for a supercharging system according to the fourth embodiment of the present invention is to be applied.
Figure 20:
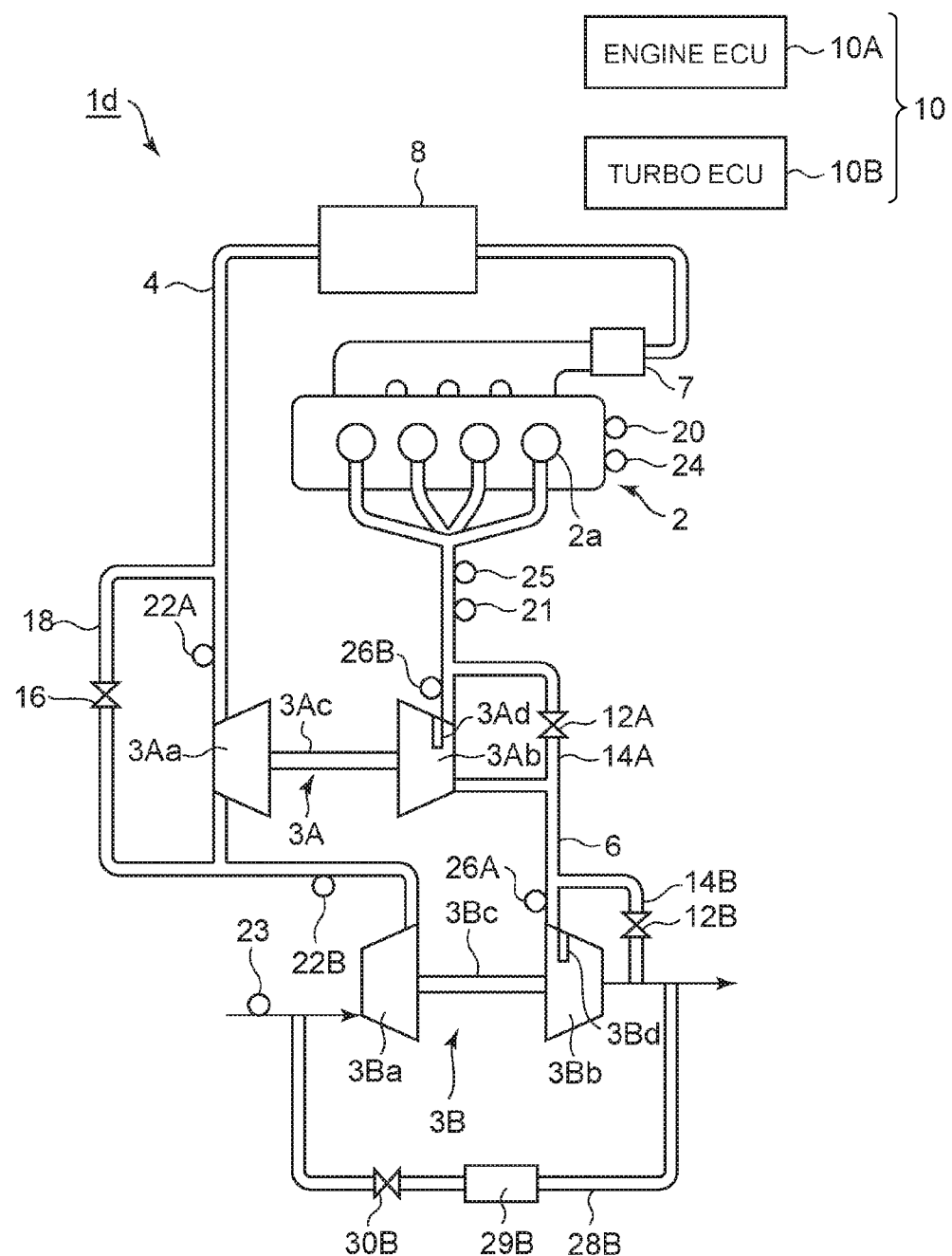
FIG. 20 is an overall configuration diagram of an engine system to which a control device for a supercharging system according to the fourth embodiment of the present invention is to be applied.

FIGS. 19 and 20 are overall configuration diagrams of an engine system to which a control device of a supercharging system according to the fourth embodiment of the present invention is to be applied. The engine systems 1c, 1d of the present embodiment basically have a similar configuration to that of the engine system of the above described embodiment, except that the engine systems 1c, 1d are two-stage supercharging systems each including a high-pressure stage turbocharger 3A and a low-pressure stage turbocharger 3B, and include an EGR system which returns a part of exhaust gas flowing through the exhaust duct 6 to the intake duct 4. Thus, the same component is associated with the same reference numeral and not described in detail.

As illustrated in FIGS. 19 and 20, the high-pressure stage turbocharger 3A includes a high-pressure stage turbine 3Ab disposed in the exhaust duct 6, and a high-pressure stage compressor 3Aa disposed in the intake duct 4. The high-pressure stage turbine 3Ab and the high-pressure stage compressor 3Aa are coupled to each other by a shaft 3Ac to be driven coaxially. The low-pressure stage turbocharger 3B includes a low-pressure stage turbine 3Bb disposed in the exhaust duct 6 at a downstream side of the high-pressure stage turbine 3Ab, and a low-pressure stage compressor 3Ba disposed in the intake duct 4 at an upstream side of the high-pressure stage compressor 3Aa. The low-pressure stage turbine 3Bb and the low-pressure stage compressor 3Ba are coupled by a shaft 3Bc to be driven coaxially.

A high-pressure stage bypass channel 14A that bypasses the high-pressure stage turbine 3Ab and a low-pressure stage bypass channel 14B that bypasses the low-pressure stage turbine 3Bb are connected to the exhaust duct 6. A high-pressure stage waste-gate valve 12A is disposed in the high-pressure stage bypass channel 14A, and a low-pressure stage waste-gate valve 12B is disposed in the low-pressure stage bypass channel 14B.

The intake-side bypass channel 18 bypassing the high-pressure stage compressor 3Aa is connected to the intake duct 4, and the bypass valve 16 is disposed in the intake-side bypass channel 18. The bypass valve 16 is controlled to be fully closed when the high-pressure stage turbocharger 3A performs supercharging, and to be fully open when the high-pressure stage turbocharger 3A does not perform supercharging. The bypass valve 16 is controlled to open and close by the above described turbo ECU 10B. Further, on respective outlet sides of the high-pressure stage compressor 3Aa and the low-pressure stage compressor 3Ba, pressure sensors 22A, 22B are disposed to detect boost pressures of the high-pressure stage compressor 3Aa and the low-pressure stage compressor 3Ba, respectively.

In the engine system 1c illustrated in FIG. 19, the above described EGR system includes a high-pressure EGR channel 28A connecting the exhaust duct 6 at an upstream side of the high-pressure stage turbine 3Ab, and the intake duct 4 at a downstream side of the high-pressure stage compressor 3Aa. The high-pressure stage EGR channel 28A includes a high-pressure EGR cooler 29A and a high-pressure EGR valve 30A, and the opening degree of the high-pressure EGR valve 30A is adjusted to control a flow rate of exhaust gas returning to the intake side. The valve opening degree of the high-pressure EGR valve 30A is controlled by the above described turbo ECU 10B. With the above high-pressure EGR system, it is possible to reduce a combustion temperature of the combustion chamber 2a to reduce NOx effectively in the engine system 1b.

In the engine system 1d illustrated in FIG. 20, the above described EGR system includes a low-pressure EGR channel 28B connecting the exhaust duct 6 at a downstream side of the low-pressure stage turbine 3Bb, and the intake duct 4 at an upstream side of the low-pressure stage compressor 3Ba. The low-pressure stage EGR channel 28B includes a low-pressure EGR cooler 29B and a low-pressure EGR valve 30B, and the opening degree of the low-pressure EGR valve 30B is adjusted to control a flow rate of exhaust gas returning to the intake side. The valve opening degree of the low-pressure EGR valve 30B is controlled by the above described turbo ECU 10B. With the above low-pressure EGR system, it is possible to reduce a combustion temperature of the combustion chamber 2a to suppress NOx effectively in the engine system 1d.

Further, in the present embodiment, WG valve opening degrees of both of the high-pressure stage waste-gate valve 12A and the low-pressure stage waste-gate valve 12B are adjusted individually, and thereby boost pressures of the high-pressure stage turbocharger 3A and the low-pressure stage turbocharger 3B are controlled individually. WG valve opening-degree command values for the high-pressure stage waste-gate valve 12A and the low-pressure stage waste-gate valve 12B are computed individually on the basis of the control logic illustrated in FIG. 13.

Figure 21:
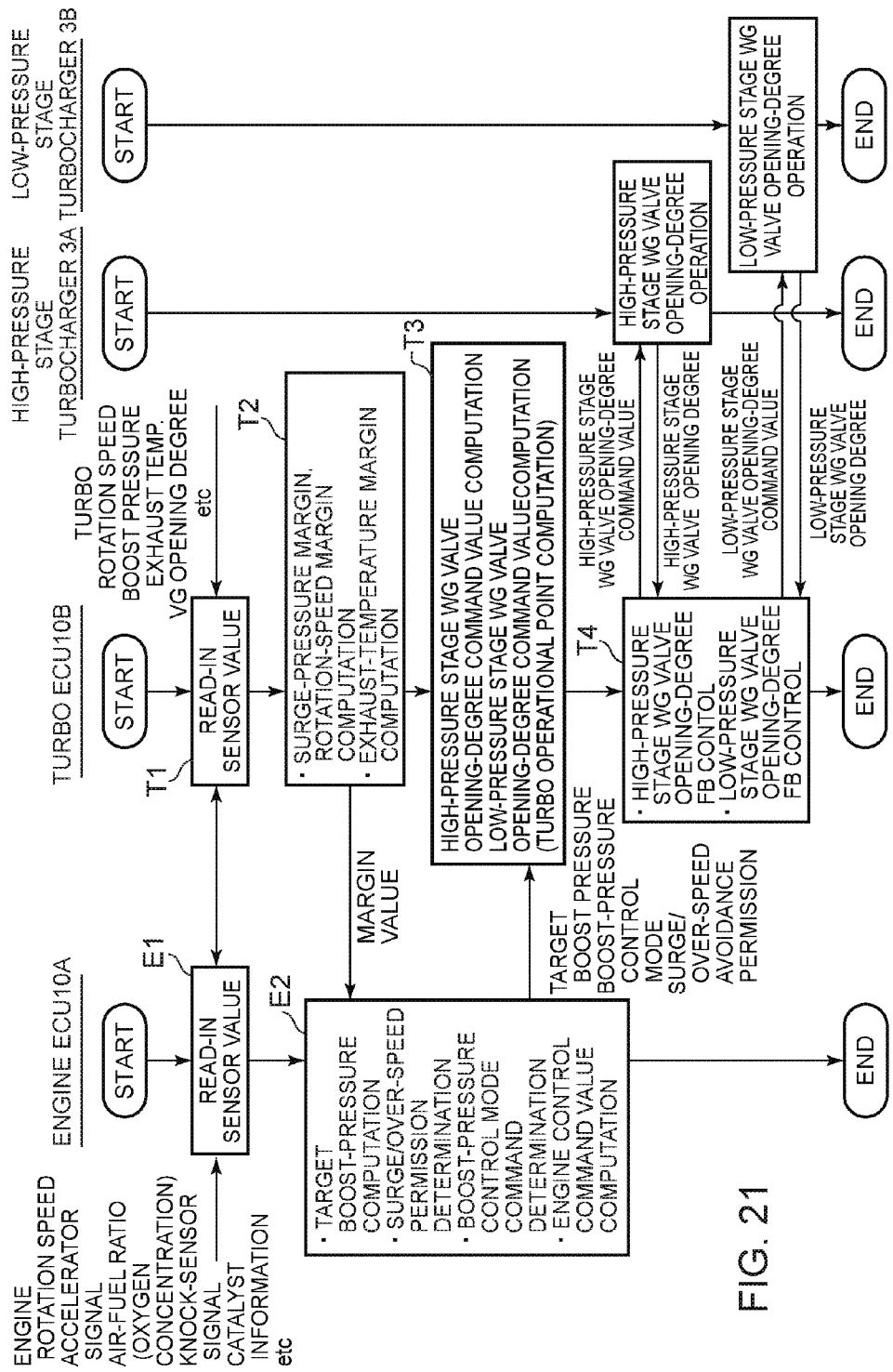
FIG. 21 is a control flowchart of a boost-pressure control unit according to the fourth embodiment.

FIG. 21 is a control flowchart of a boost-pressure control unit according to the fourth embodiment. The present flowchart is substantially similar to the control flowchart corresponding to the above described first to third embodiments, but is different from the first to third embodiments in that, a high-pressure stage WG valve opening-degree command value and a low-pressure stage WG valve opening-degree command value are computed in step T3, and not only a high-pressure stage WG valve opening degree but also a low-pressure stage WG valve opening degree is controlled in step T4.

According to the present embodiment, in a two-stage supercharging system including the high-pressure stage turbocharger 3A and the low-pressure stage turbocharger 3B, a WG valve opening degree of the high-pressure stage waste-gate valve 12A being a boost-pressure control unit for the high-pressure stage turbocharger 3A and a WG valve opening degree of the low-pressure stage waste-gate valve 12B being a boost-pressure control unit for the low-pressure stage turbocharger 3B are adjusted individually, and thereby boost pressures of the high-pressure stage turbocharger 3A and the low-pressure stage turbocharger 3B are controlled, which makes it possible to prevent surging in advance while suppressing rapid fluctuation of boost pressures.

While the engine system 1c includes only the high-pressure stage EGR system and the engine system 1d includes only the low-pressure stage EGR system in the above embodiment, an engine system according to the present invention may include both of the high-pressure EGR system and the low-pressure EGR system. Further, if the bypass valve 16, the high-pressure EGR valve 30A, and the low-pressure EGR valve 30B are controlled, boost pressures are also affected. Thus, in addition to the above described high-pressure stage waste-gate valve 12A and low-pressure stage waste-gate valve 12B, the bypass valve 16, the high-pressure EGR valve 30A, and the low-pressure EGR valve 30B may be used as a boost-pressure control unit.

Fifth Embodiment

The engine system according to the present embodiment has a similar configuration to that of the engine systems 1c, 1d illustrated in FIGS. 19 and 20, and will not be described in detail.

In the present embodiment, a VG opening degree of the variable control mechanism 3Ad of the high-pressure stage turbocharger 3A and a VG opening degree of the variable control mechanism 3Bd of the low-pressure stage turbocharger 3B are adjusted individually, and thereby boost pressures of the high-pressure stage turbocharger 3A and the low-pressure stage turbocharger 3B are controlled individually. A VG opening-degree command value for the variable control mechanism 3Ad of the high-pressure stage turbocharger 3A and a VG opening-degree command value for the variable control mechanism 3Bd of the low-pressure stage turbocharger 3B are computed individually on the basis of the control logic illustrated in FIG. 5.

Figure 22:
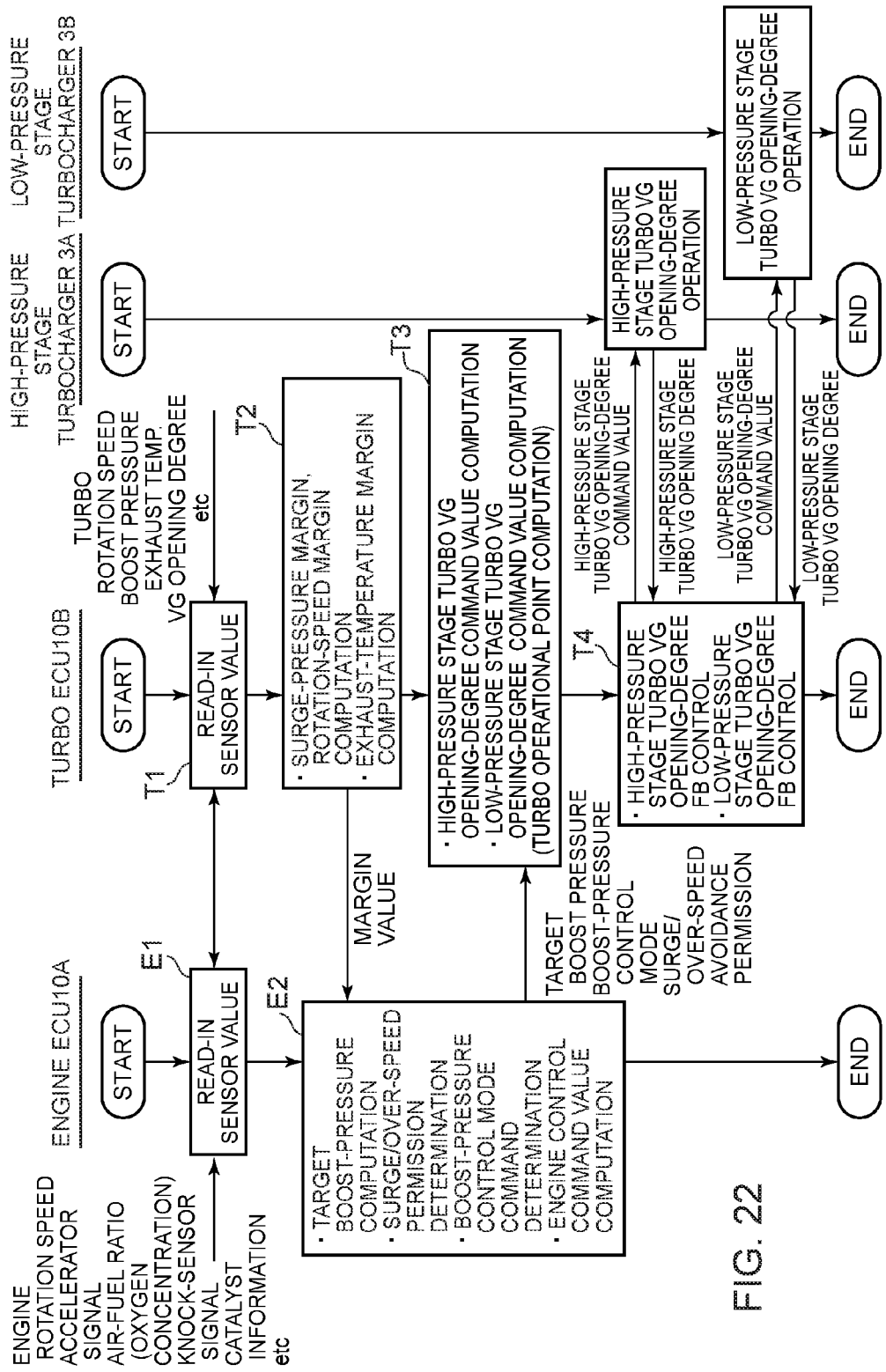
FIG. 22 is a control flowchart of another boost-pressure control unit according to the fifth embodiment.

FIG. 22 is a control flowchart of a boost-pressure control unit according to the fifth embodiment. The present flowchart is substantially similar to the control flowchart in the above described fourth embodiment, but is different from the fourth embodiment in that, a VG opening degree command value of the variable control mechanism 3Ad of the high-pressure stage turbocharger 3A and a VG opening degree command value of the variable control mechanism 3Bd of the low-pressure stage turbocharger 3B are computed in step T3, and a VG opening degree of the variable control mechanism 3Ad of the high-pressure stage turbocharger 3A and a VG opening degree of the variable control mechanism 3Bd of the low-pressure stage turbocharger 3B are controlled in step T4. In the present embodiment, VG opening degrees of both of the variable control mechanism 3Ad of the high-pressure stage turbocharger 3A and the variable control mechanism 3Bd of the low-pressure stage turbocharger 3B may not be necessarily controlled, and it is sufficient if a VG opening degree of at least one of the mechanisms is controlled.

According to the present embodiment, in a two-stage supercharging system including the high-pressure stage turbocharger 3A and the low-pressure stage turbocharger 3B, at least one of the variable control mechanism 3Ad of the high-pressure stage turbocharger 3A being a boost-pressure control unit for the high-pressure stage turbocharger 3A or the variable control mechanism 3Bd of the low-pressure stage turbocharger 3B being a boost-pressure control unit for the low-pressure stage turbocharger 3B is adjusted, and thereby a boost pressure of at least one of the high-pressure stage turbocharger 3A or the low-pressure stage turbocharger 3B is controlled, which makes it possible to prevent surging in advance while suppressing rapid fluctuation of boost pressures.

The embodiments of the present invention have been described above. However, the present invention is not limited thereto. For instance, various modifications may be applied as long as they do not depart from the object of the present invention.

INDUSTRIAL APPLICABILITY

At least one embodiment of the present invention can be suitably used as a control device for a supercharging system for supplying an engine with compressed intake air, in an engine for an automobile, a ship, or an industrial use.

DESCRIPTION OF REFERENCE NUMERALS 1, 1a-1d Engine system
2 Engine
2a Combustion chamber
3 Turbocharger
3a Compressor
3b Turbine
3c shaft
3d Variable control mechanism
3A High-pressure stage turbocharger
3Aa High-pressure stage compressor
3Ab High-pressure stage turbine
3Ac shaft
3Ad Variable control mechanism
3B Low-pressure stage turbocharger
3Ba Low-pressure stage compressor
3Bb Low-pressure stage turbine
3Bc shaft
3Bd Variable control mechanism
4 Intake duct
5 Electric turbocharger
5a Electric compressor
5b Motor
5c shaft
5d Inverter (rotation-speed control unit)
6 Exhaust duct
8 inter cooler
10 Control device
10A Engine ECU
10B Turbo ECU
12 Waste-gate valve
12A High-pressure stage waste-gate valve
12B Low-pressure stage waste-gate valve
14 Bypass channel
14A High-pressure stage bypass channel
14B Low-pressure stage bypass channel
16 Bypass valve
18 Intake-side bypass channel
20 Engine rotation-steed sensor
21 Air-fuel ratio sensor
22, 22A, 22B Pressure sensor
23 Air-flow meter
24 Knock sensor
25 Exhaust temperature sensor
26 Pressure sensor
27 Turbo rotational-speed sensor
28 A High-pressure EGR channel
28B Low-pressure EGR channel
29A High-pressure EGR cooler
29B Low-pressure EGR cooler
30A High-pressure EGR valve

The invention claimed is:

1. A supercharging system for supplying compressed intake air to an engine, the supercharging system comprising a supercharger configured to compress intake air to be supplied to the engine, a boost-pressure control unit including at least one of a variable control mechanism and a waste-gate valve configured to control a boost pressure of the supercharger, and a control device configured to control the boost-pressure control unit, and the control device comprising:

an engine controller comprising a first processor configured operate an engine-signal input to which various sensor signals related to an operational state of the engine are to be inputted, and configured to control an operational state of the engine based on the sensor signals inputted into the engine-signal input; and a turbo controller comprising a second processor configured to operate a turbo-signal input to which at least sensor signals related to an operational state of the supercharger are to be inputted from among, the various sensor signals related to an operational state of the engine, and configured to compute a turbo control command value corresponding to a target boost pressure of the supercharger, the turbo controller comprising a control and a signal input provided separately and independently from the engine controller and the turbo controller being provided as a separate member from the engine controller;

wherein the boost-pressure control unit is configured to be controlled so that the boost pressure of the supercharger reaches the target boost pressure through output of the turbo control command value to the boost-pressure control unit;

wherein the second processor is further configured to compute a margin of the supercharger based on the sensor signals inputted to the turbo-signal input;

wherein the first processor is further configured to compare the margin computed by the margin computing part with a margin threshold predetermined in advance; and wherein a response time before the boost pressure of the supercharger reaches the target boost pressure is longer if the margin is below the margin threshold than if the margin is over the margin threshold.

2. The supercharging system according to claim 1, wherein the margin threshold is determined based on at least one of a difference between the target boost pressure of the supercharger and an actual boost pressure, and a difference between a target fuel-injection amount and an actual fuel-injection amount.

3. The supercharging system according to claim 1, wherein the supercharger is a turbocharger including a turbine disposed in an exhaust duct of the engine and driven to rotate by exhaust energy from the engine, a compressor disposed in an intake duct of the engine and coaxially driven with the turbine, and the boost pressure control unit is the variable control mechanism configured to control a flow of exhaust gas flowing into the turbine; and
wherein the control device is configured to adjust the variable control mechanism to control a flow of the exhaust gas flowing into the turbine to control the boost pressure of the supercharger.

4. The supercharging system according to claim 1, wherein the supercharger comprises a turbocharger, including a turbine disposed in an exhaust duct of the engine and driven to rotate by exhaust energy from the engine, and a compressor disposed in an intake duct of the engine and driven coaxially with the turbine;
wherein a bypass channel bypassing the turbine is connected to the exhaust duct of the engine and the boost pressure control unit being the waste-gate valve is disposed in the bypass channel; and
wherein the control device is configured to adjust a valve opening degree of the waste-gate valve to control the boost pressure of the supercharger.

5. The supercharging system according to claim 1, wherein the supercharger is a turbocharger including a turbine disposed in an exhaust duct of the engine and driven to rotate by exhaust energy from the engine, a compressor disposed in an intake duct of the engine and coaxially driven with the turbine, a bypass channel bypassing the turbine connected to the exhaust duct of the engine, and the boost pressure control unit is the variable control mechanism and the waste-gate valve disposed in the bypass channel; and
wherein the control device adjusts the variable control mechanism to allow a flow of the exhaust gas flowing into the turbine, and adjusts a valve opening degree of the waste-gate valve to allow the flow of the exhaust gas flowing through the bypass channel to control the boost pressure of the supercharger.

6. The supercharging system according to claim 5, wherein the boost-pressure controlled by the variable control mechanism has higher control responsiveness than the boost-pressure controlled by the waste-gate valve.

7. The supercharging system according to claim 1, wherein the supercharger comprises:
a turbocharger including a turbine disposed in an exhaust duct of the engine and driven to rotate by exhaust energy of exhaust gas discharged from the engine, and a compressor disposed in an intake duct of the engine and coaxially driven with the turbine; and
an electric turbocharger including an electric compressor disposed on an upstream side or a downstream side of the compressor of the turbocharger, a motor configured to drive the electric compressor to rotate, and a rotation-speed control unit configured to control a rotation speed of the motor;
wherein a bypass channel bypassing the turbine is connected to the exhaust duct of the engine and the boost pressure control unit is the waste-gate valve is disposed in the bypass channel; and
wherein the control device is configured to adjust a valve opening degree of the waste-gate valve to control the boost pressure of the turbocharger, and to control a rotation speed of the motor with the rotation-speed control unit to control a boost pressure of the electric turbocharger.

8. The supercharging system according to claim 1, wherein the supercharger comprises:
a high-pressure stage turbocharger including a high-pressure stage turbine disposed in an exhaust duct of the engine and driven to rotate by exhaust energy of exhaust gas discharged from the engine, and a high-pressure stage compressor disposed in an intake duct of the engine and coaxially driven with the high-pressure stage turbine; and
a low-pressure stage turbocharger including a low-pressure stage turbine disposed in the exhaust duct at a downstream side of the high-pressure stage turbine, and a low-pressure stage compressor disposed in the intake duct at an upstream side of the high-pressure stage compressor and coaxially driven with the low-pressure stage turbine;
wherein a high-pressure stage bypass channel bypassing the high-pressure stage turbine and a low-pressure stage bypass channel bypassing the low-pressure stage turbine are connected to the exhaust duct of the engine;
wherein the boost pressure control unit includes a high-pressure stage waste-gate valve disposed in the high-pressure stage bypass channel, and a low-pressure stage waste-gate valve disposed in the low-pressure stage bypass channel; and
wherein the control device is configured to adjust valve opening degrees of the high-pressure stage waste-gate valve and the low-pressure stage waste-gate valve individually to control boost pressures of the high-pressure stage turbocharger and the low-pressure stage turbocharger individually.

9. The supercharging system according to claim 1, wherein the supercharger comprises;
a high-pressure stage turbocharger including a high-pressure stage turbine disposed in an exhaust duct of the engine and driven to rotate by exhaust energy of exhaust gas discharged from the engine, and a high-pressure stage compressor disposed in an intake duct of the engine and coaxially driven with the high-pressure stage turbine; and
a low-pressure stage turbocharger including a low-pressure stage turbine disposed in the exhaust duct at a downstream side of the high-pressure stage turbine, and a low-pressure stage compressor disposed in the intake duct at an upstream side of the high-pressure stage compressor and coaxially driven with the low-pressure stage turbine;
wherein at least one of the high-pressure stage turbocharger and the low-pressure stage turbocharger includes the boost pressure control unit being a variable geometry turbocharger including a variable control mechanism configured to control a flow of the exhaust gas flowing into the at least one of the high-pressure stage turbine and the low-pressure stage turbine; and
wherein the control device is configured to adjust the variable control mechanism of the at least one of the high-pressure stage turbocharger and the low-pressure stage turbocharger to control a flow of the exhaust gas to control a boost pressure of the at least one of the high-pressure stage turbocharger and the low-pressure stage turbocharger.

10. A supercharging system for supplying compressed intake air to an engine, the supercharging system comprising a supercharger configured to compress intake air to be supplied to the engine, a boost-pressure control unit including at least one of a variable control mechanism and a waste-gate valve to control a boost pressure of the supercharger, and a control device configured to control the boost-pressure control unit, and the control device comprising:

an engine controller comprising a first processor configured operate an engine-signal input to which various sensor signals related to an operational state of the engine are to be inputted, and configured to control an operational state of the engine based on the sensor signals inputted into the engine-signal input; and a turbo controller comprising a second processor configured to operate a turbo-signal input to which at least sensor signals related to an operational state of the supercharger are to be inputted from among the various sensor signals related to an operational state of the engine, and configured to compute a turbo control command value corresponding to a target boost pressure of the supercharger, the turbo controller comprising a control and a signal input provided separately and independently from the engine controller and the turbo controller being provided as a separate member from the engine controller;

wherein the boost-pressure control unit is configured to be controlled so that the boost pressure of the supercharger reaches the target boost pressure through output of the turbo control command value to the boost-pressure control unit;

wherein the first processor is configured to recognize one boost-pressure control mode selected from among two or more boost-pressure control modes; and wherein the second processor is configured to perform a feedback control on the turbo control command value based on a control gain determined in advance and a difference between the target boost pressure of the supercharger and an actual boost pressure, and to vary the control gain in accordance with the one boost-pressure control mode recognized by the first processor.

11. The supercharging system according to claim 10, wherein the supercharger is a turbocharger including a turbine disposed in an exhaust duct of the engine and driven to rotate by exhaust energy from the engine, a compressor disposed in an intake duct of the engine and coaxially driven with the turbine, and the boost pressure control unit is a variable control mechanism configured to control a flow of exhaust gas flowing into the turbine; and wherein the control device is configured to adjust the variable control mechanism to control a flow of the exhaust gas flowing into the turbine to control the boost pressure of the supercharger.

\* \* \* \* \*